(12) United States Patent
Hayase et al.

(10) Patent No.: US 7,017,147 B2
(45) Date of Patent: Mar. 21, 2006

(54) COMPUTER READABLE MEDIUM, METHOD, AND SYSTEM FOR SUPPORTING SYSTEM DEVELOPMENT

(75) Inventors: Takeo Hayase, Chofu (JP); Takanobu Ando, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 501 days.

(21) Appl. No.: 10/179,986

(22) Filed: Jun. 26, 2002

(65) Prior Publication Data

US 2003/0018955 A1 Jan. 23, 2003

(30) Foreign Application Priority Data

Jun. 27, 2001 (JP) ............................. 2001-195162

(51) Int. Cl.
*G06F 9/44* (2006.01)
(52) U.S. Cl. ...................... 717/108; 717/104; 717/116
(58) Field of Classification Search ........ 717/100–117, 717/136–137
See application file for complete search history.

(56) References Cited

U.S. PATENT DOCUMENTS 6,199,195 B1 * 3/2001 Goodwin et al. ........... 717/104
6,253,366 B1 * 6/2001 Mutschler, III ............. 717/104

FOREIGN PATENT DOCUMENTS

JP 2001-166937 6/2001

OTHER PUBLICATIONS

Garzotto et al., "Support Reusable Web Design with DDM-Edit", IEEE, pp.: 1-10, Jan. 2001.*
Lee et al., "XML-based Retrieval of Object-oriented Frameworks", IEEE, pp.: 2953-2958. 2000.*
T. Hayase, et al., Proceedings of the 39th International Conference and Exhibition on Technology of Object-Oriented Languages and Systems, pp. 108-119, "A Three-View Model for Developing Object-Oriented Frameworks", Jul. 29-Aug. 3, 2001.

* cited by examiner

Primary Examiner—Ted T. Vo
(74) Attorney, Agent, or Firm—Oblon, Spivak, McClelland, Maier & Neustadt, P.C.

(57) ABSTRACT

A computer readable medium having computer readable program code means embodied therein, the computer program code means comprising a code that presents a user with architecture information in which framework candidates are hierarchically classified according to properties, and accepts a designation of a framework, of the candidates, which are to be included in a system as a development target from the user, a code that supports the user to determine a reference model representing a general structure of the system, a code that supports the user to extract an object to be included in the system, in accordance with the reference model determined by the user, and a code that supports the user to develop the system, on the basis of the framework designated by the user and the object extracted by the user.

20 Claims, 32 Drawing Sheets

```
<News story>
<Title>XML project</Title>
<Creation date>2000/7/18</Creation date>
<News story creator Reporter's ID="92146910">H_T</News story creator>
<Abstract>XML analysis/design methodology…</Abstract>
<Paragraph>
  For developing XML-based system…
</Paragraph>
     ……
</News story>
```

Hierarchical structure

```
<News story>
<Header>
  <Title>XML project</Title>
  <Creation date>2000/7/18</Creation date>
  <News story creator Reporter's ID="92146910">H_T</News story creator>
</Header>
<Text>
  <Abstract>XML analysis/design methodology…</Abstract>
  <Report>
    <Paragraph>
      For developing XML-based system…
    </Paragraph>
  </Report>
     ……
</Text>
</News story>
```

```xml
<?xml version="1.0" encoding="Shift_JIS"?>
<article>
    <title>A.Release...</title>
    <product_summary>
        <shipping_date>Release now!!</shipping_date>
        <product_list>
            <product>
                <name>XX systems</name>
                <price currency="yen">70,000yen</price>
            </product>
            <product>
                <name>XX cards</name>
                <price currency="yen">22,000yen</price>
            </product>
        </product_list>
        <address>
            <name>A diak</name>
            <phone_number>XXXX-XX-XXXX</phone_number>
        </address>
    </product_summary>
    <body>
        <paragraph><url_link url="http://www.A.co.jp/">A Corporation</url_link>release...</paragraph>
        <paragraph>This system...</paragraph>
        <paragraph>It can...</paragraph>
        <figure>
            <instance type="GIF" file="systems.gif"/>
            <title/>
        </figure>
        <figure>
            <instance type="GIF" file="PC card.gif"/>
            <title>PC card</title>
        </figure>
    </body>
    <figure_list>
    </figure_list>
    <reference_list>
        <reference url="http://www.A.co.jp/">A Web page</reference>
        <reference url="http://www.A.co.jp/XX.htm/">News Release</reference>
        <rerated_article url="http://www.A.co.jp/YY.htm/">
            <date>'99/8/26</date>
            <title>Related Articles</title>
        </rerated_article>
    </reference_list>
    <reported_date>'2001/4/20</reported_date>
    <reporter>H_T@Sito.A.co.jp</reporter>
</article>
```

| Notation | Explanation | Notation | Explanation |
|---|---|---|---|
| ▭ | Element name (upper side), Attribute name (lower side) | ? | Appearing 0 or 1 time |
| | | * | Appearing 0 or more times |
| ⊙→ | Appearing sequentially from left to right | + | Appearing one or more times |
| ⊙· | One of them appears | #PCDATA | Element is text |
| —— | Always appearing once | | |

```
<!DOCTYPE article [
<!ELEMENT article (title, product_summary, body, figure_list*, reference_list*,
reported_date, reporter)>
<!ELEMENT title (#PCDATA)>
<!ELEMENT product_summary (shipping_date, product_list, address)>
<!ELEMENT shipping_date (#PCDATA)>
<!ELEMENT product_list (product)>
<!ELEMENT product(name, price)>
<!ELEMENT name (#PCDATA)>
<!ELEMENT price (#PCDATA)>
<!ATTLIST price currency NMTOKEN #REQUIRED>
<!ELEMENT address(name, phone_number)>
<!ELEMENT phone_number (#PCDATA)>

<!ELEMENT body (paragraph+)>
<!ELEMENT paragraph (#PCDATA|url_link)*>
<!ELEMENT url_link (#PCDATA)>
<!ATTLIST url_link url CDATA #REQUIRED>

<!ELEMENT figure_list (figure+)>
<!ELEMENT figure (instance, title)>
<!ELEMENT instance (#PCDATA)*>
<!ATTLIST instance type CDATA #IMPLIED
          file CDATA #REQUIRED>

<!ELEMENT reference_list (reference|rerated_article)+>
<!ELEMENT reference (#PCDATA)>
<!ATTLIST reference url CDATA #IMPLIED>
<!ELEMENT rerated_article (date, title)>
<!ELEMENT date (#PCDATA)>

<!ELEMENT reported_date (#PCDATA)>
<!ELEMENT reporter (#PCDATA)>

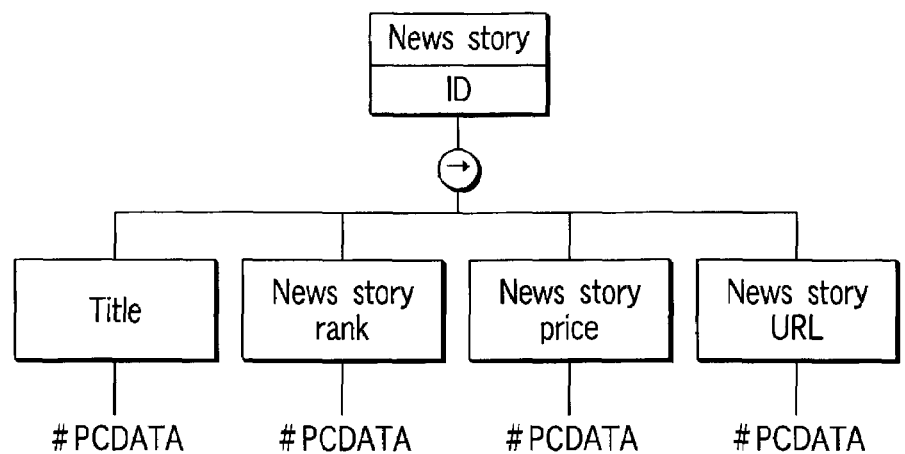
F I G. 27
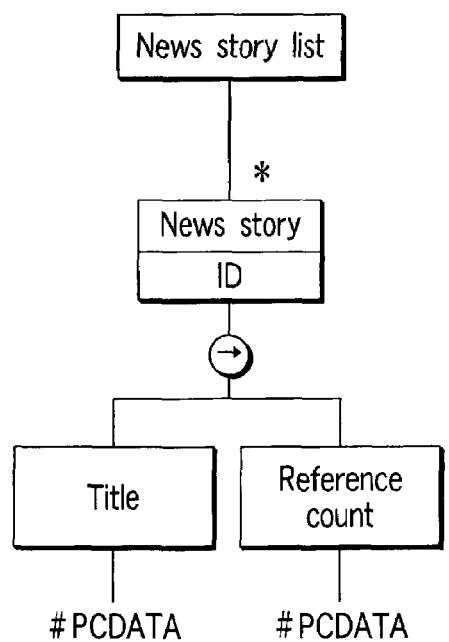
F I G. 28

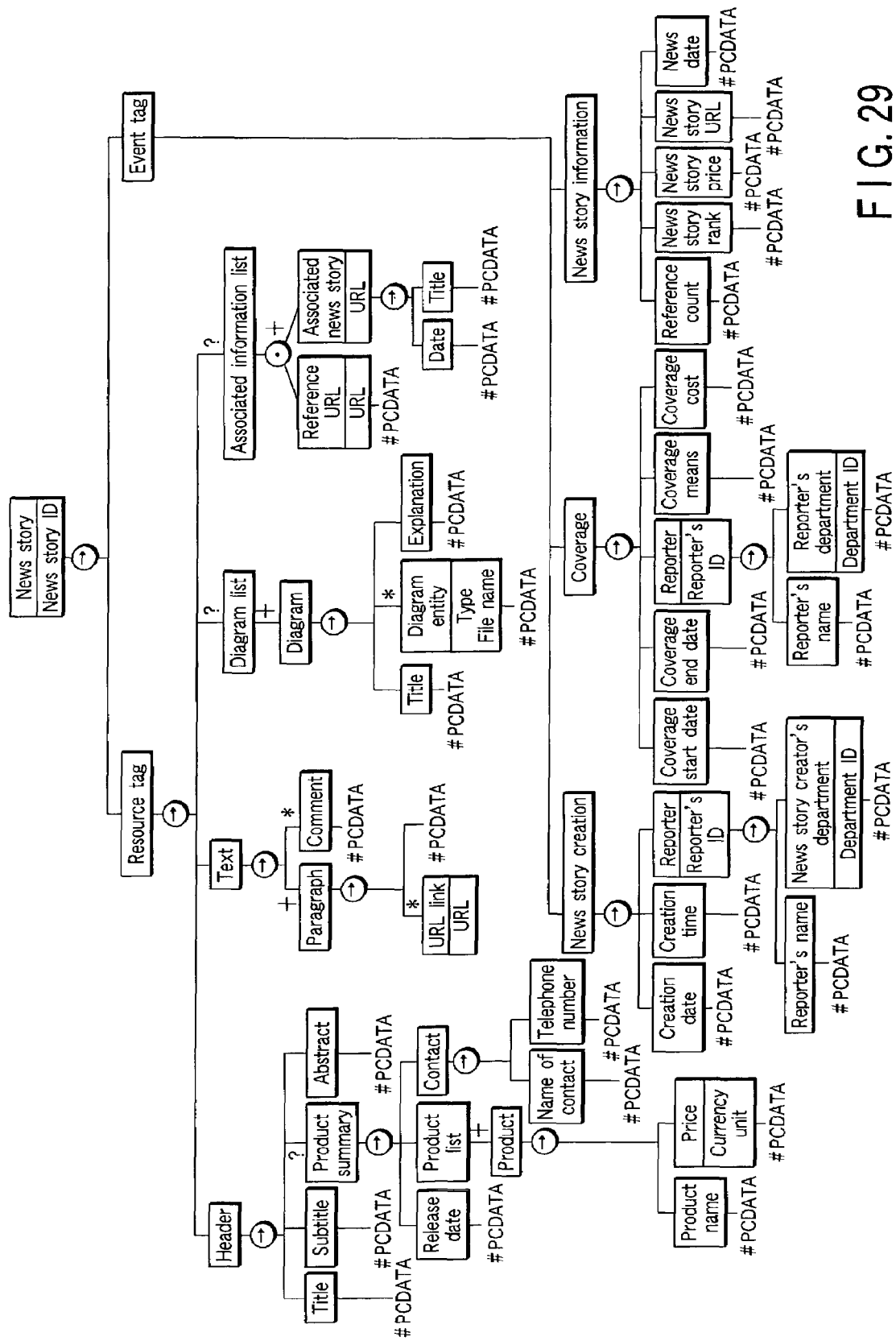
F I G. 29

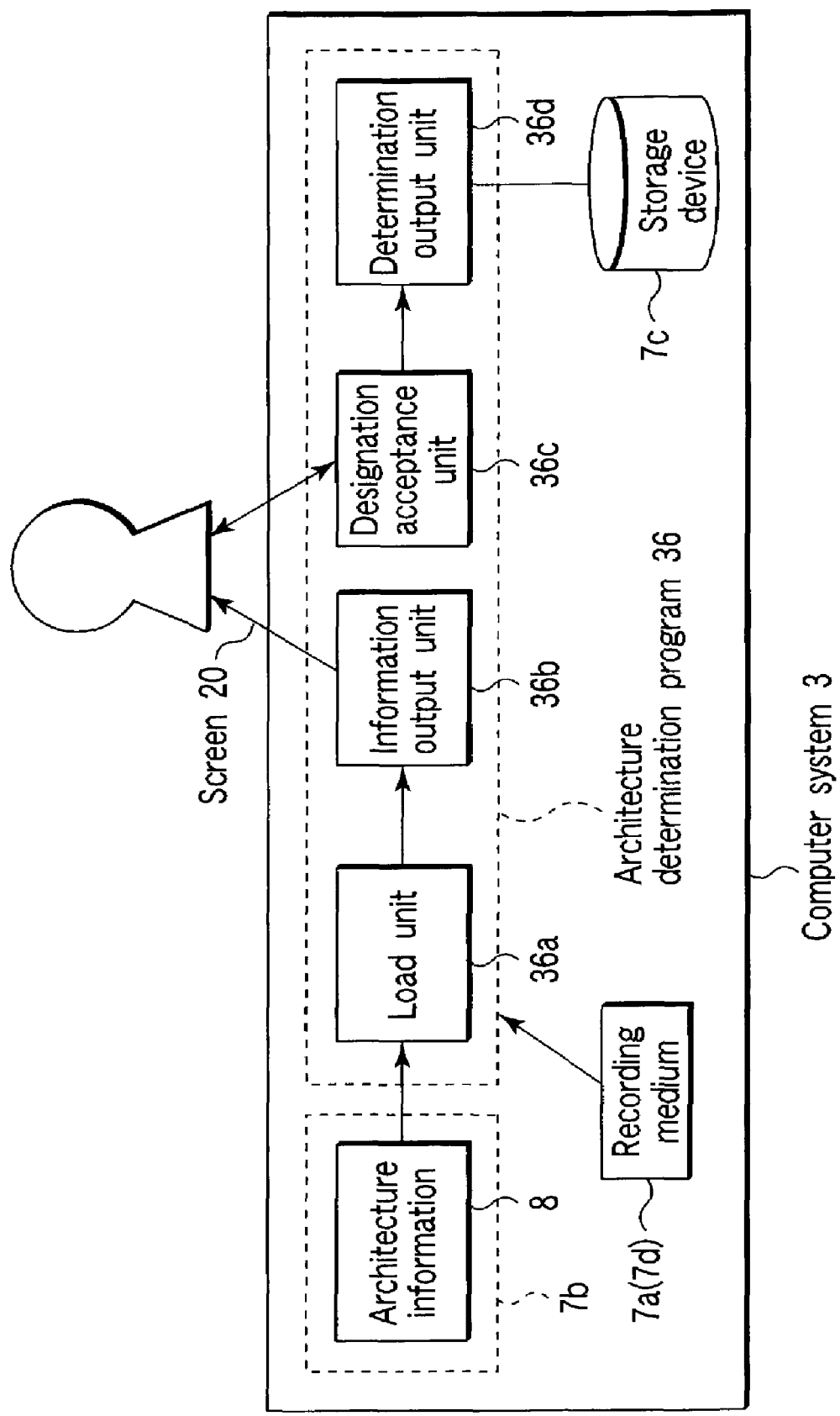
F I G. 35

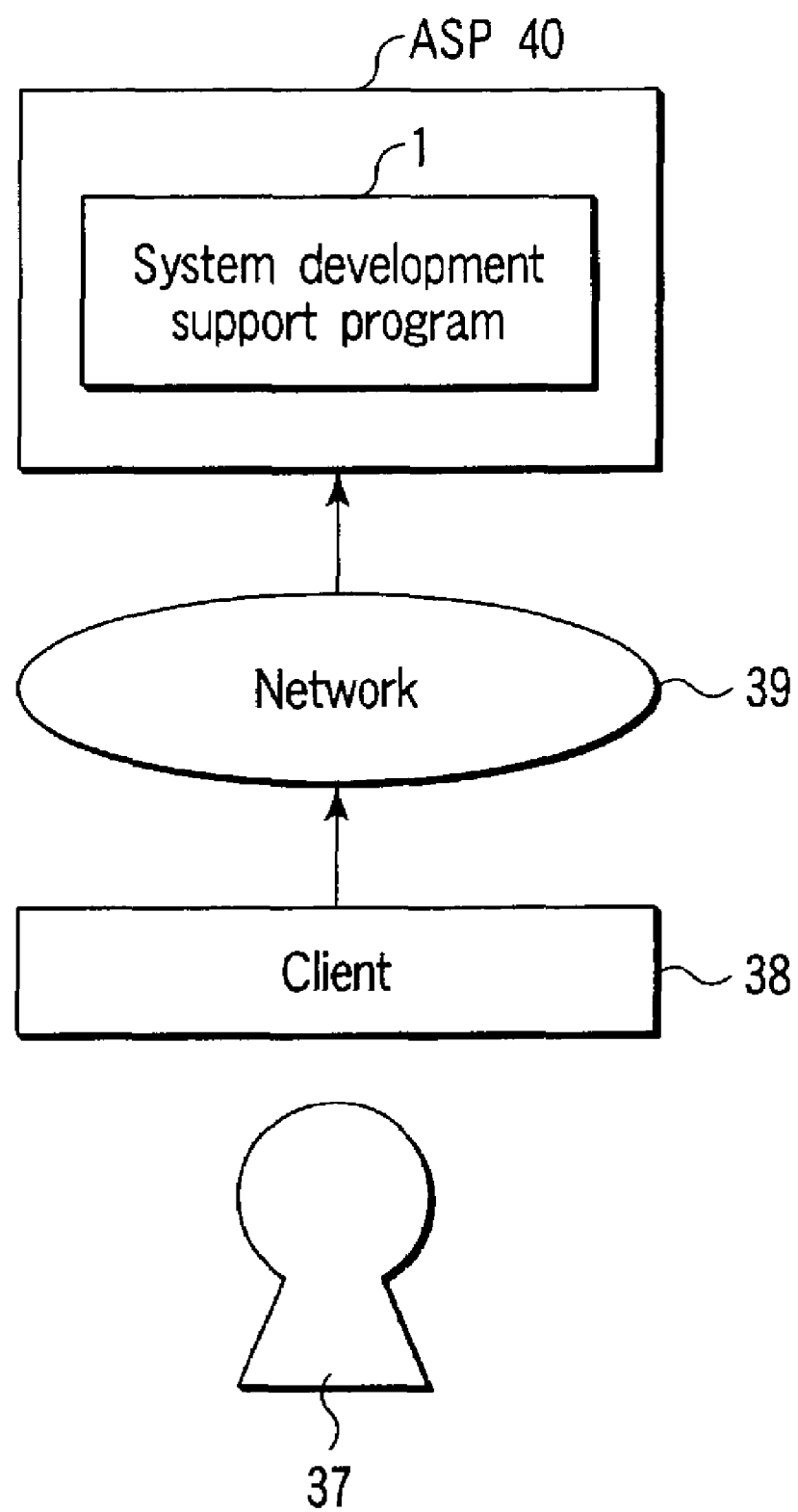
F I G. 40

US 7,017,147 B2

COMPUTER READABLE MEDIUM, METHOD, AND SYSTEM FOR SUPPORTING SYSTEM DEVELOPMENT

CROSS-REFERENCE TO RELATED APPLICATIONS

This application is based upon and claims the benefit of priority from the prior Japanese Patent Application No. 2001-195162, filed Jun. 27, 2001, the entire contents of which are incorporated herein by reference.

BACKGROUND OF THE INVENTION

1. Field of the Invention

The present invention relates to a computer readable medium, method, and system, such as a CASE (Computer Aided Software Engineering) tool, which support the development of software or a system.

2. Description of the Related Art

XML (extensible Markup Language) is a kind of data description language. A hierarchical data structure can be defined by using XML.

Industry-standardization of XML has been promoted by many corporations such as banks and manufacturers. XML is used to describe data to be exchanged between corporations through communication lines such as the Internet, intranets, and private LANs.

Exchange of data described in XML between corporations can increase business chances.

The frequency that data to be exchanged between corporations is described in XML is increasing.

However, system development techniques with consideration given to the characteristics of XML have not been fully explored.

If a system that handles XML is developed without any consideration given to the characteristics of XML, there may not be sufficient merit in using XML.

BRIEF SUMMARY OF THE INVENTION

The present invention has been made in consideration of the above situation, and has as its object to provide a computer readable medium, method, and system which support the development of a system or software by supporting the task of selecting a framework, and are effective in developing the system or software that inherits the merits of the framework.

According to an embodiment of the present invention, there is provided a computer readable medium having computer readable program code means embodied therein, the computer program code means comprising:

a computer readable program code that presents a user with architecture information in which framework candidates are hierarchically classified according to properties, and accepts a designation of a framework, of the candidates, which are to be included in a system as a development target from the user;

a computer readable program code that supports the user to determine a reference model representing a general structure of the system;

a computer readable program code that supports the user to extract an object to be included in the system, in accordance with the reference model determined by the user; and a computer readable program code that supports the user to develop the system, on the basis of the framework designated by the user and the object extracted by the user.

According to another embodiment of the present invention, there is provided a method for supporting system development by a computer, comprising:

presenting a user with architecture information in which framework candidates are hierarchically classified according to properties;

accepting a designation of a framework, of the candidates, which are to be included in a system as a development target from the user;

supporting the user to determine a reference model representing a general structure of the system;

supporting the user to extract an object to be included in the system in accordance with the reference model determined by the user; and supporting the user to develop the system on the basis of the framework designated by the user and the object extracted by the user.

According to still another embodiment of the present invention, there is provided a method for supporting system development by a computer, comprising:

supporting a user to determine a portion, of a system as a development target, to which structured data having data items hierarchically described is to be applied;

presenting the user with architecture information in which framework candidates are hierarchically classified according to properties and the portion to which the structured data is to be applied, and accepting, from the user, a designation of a framework, of the candidates, which is to be included in the system and designation of a framework to which the structured data is to be applied in the system;

supporting the user to determine a reference model representing a general structure of the system;

supporting the user to extract an object to be included in the system in accordance with the reference model determined by the user;

supporting the user to determine whether the object extracted by the user handles the structured data; and supporting the user to develop the system on the basis of the framework designated by the user, the designation of the framework to which the structured data is to be applied, the object extracted by the user, and the result of determining whether the object handles the structured data.

According to still another embodiment of the present invention, there is provided a system for supporting system development, comprising:

an architecture determination unit that presents a user with architecture information in which framework candidates are hierarchically classified according to properties, and accepts a designation of a framework, of the candidates, which are to be included in a system as a development target from the user;

a reference model construction unit that supports the user to determine a reference model representing a general structure of the system;

an object extraction unit that supports the user to extract an object to be included in the system, in accordance with the reference model determined by the user; and an object implementation unit that supports the user to develop the system, on the basis of the framework designated by the user and the object extracted by the user.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 20 is a view showing an example of data to which group tags are added;

FIG. 22 is a view showing an example of how the stratified news story is described in XML;

FIG. 25 is a view showing an example of how a designed schema is implemented by DTD;

FIG. 27 is a view showing an example of the design result on an XML schema concerning "management of news story for ranking/pricing";

FIG. 28 is a view showing an example of the design result on an XML schema concerning "display of reference ranking";

FIG. 29 is a view showing an example of a common XML data schema designed by integrating a plurality of XML schemas;

FIG. 35 is a block diagram showing an example of how an architecture determination program operates;

FIG. 40 is a block diagram showing an example of a service providing form implemented by a document analysis program.

DETAILED DESCRIPTION OF THE INVENTION

A system development support program for supporting the development of system for transmitting/receiving XML data will be described in this embodiment. For example, XML is utilized for describing in structured data.

Figure 1:
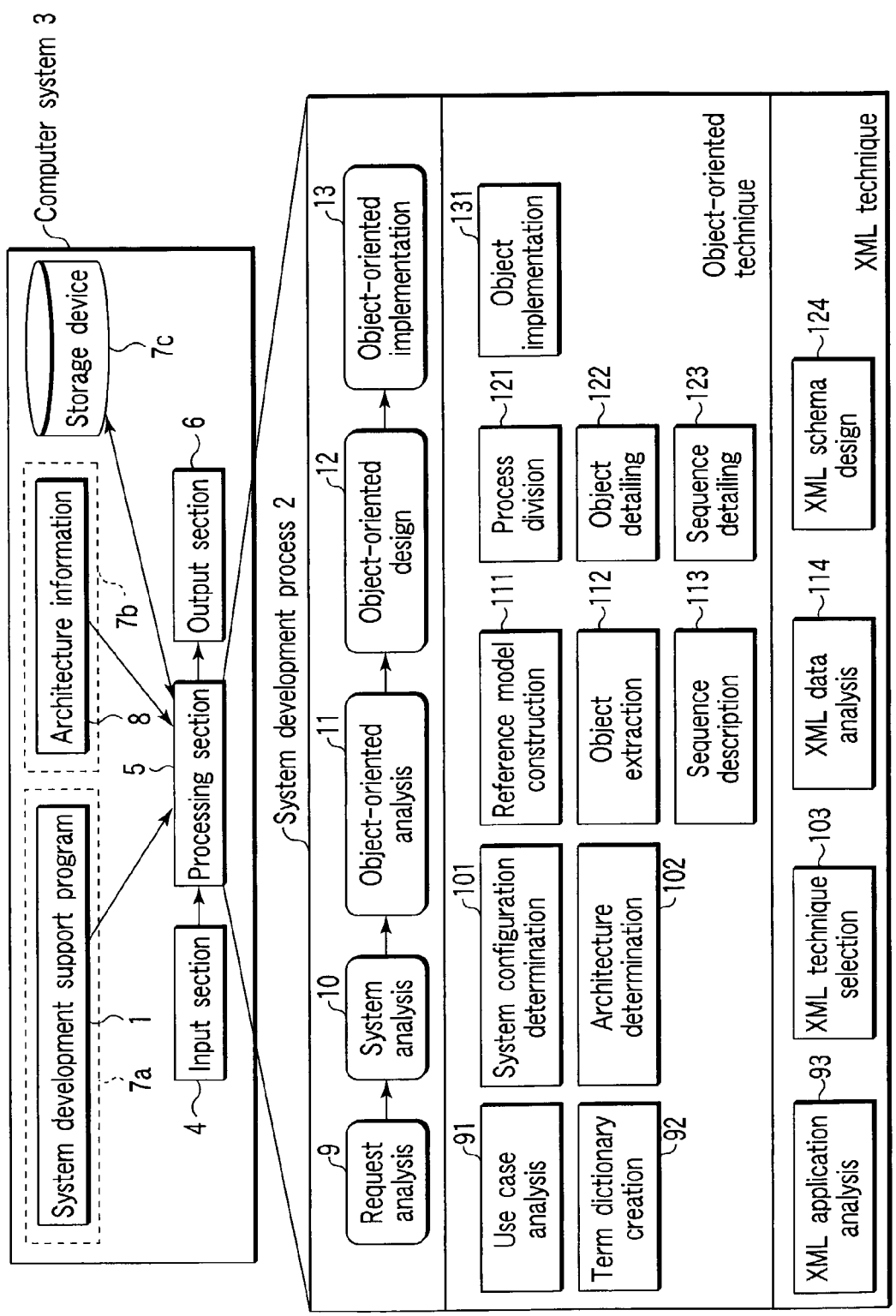
FIG. 1 is a block diagram showing an example of a system development support system according to the first embodiment of the present invention.

FIG. 1 is a block diagram showing of the system development support system according to this embodiment.

A system development support program 1 is recorded on a recording medium 7a. The system development support program 1 is a kind of CASE tool. The system development support program 1 supports the tasks done by a system developer in accordance with a system development process 2. In order to support the work done by a system developer, the system development support program 1 includes a GUI (Graphical User Interface), drawing function, editor function and general functions as those of a development support tool.

A computer system 3 includes an input section 4, processing section 5, and output section 6. The processing section 5 loads the system development support program 1 recorded on the recording medium 7a and architecture information 8 recorded on a recording medium 7b, and executes corresponding processing.

Necessary Data and created data for the system development process 2 are stored in a storage device 7c.

The system development process 2 executed by the system development support program 1 sequentially includes a request analysis phase 9, system analysis phase 10, object-oriented analysis phase 11, object-oriented design phase 12, and object-oriented implementation phase 13.

The tasks done in the respective phases 9 to 13 are mainly classified into development tasks 91, 92, 101, 102, 111 to 113, 121 to 123, and 131 corresponding to object-oriented techniques, and development tasks 93, 103, 114, and 124 corresponding to XML techniques.

Figure 2:
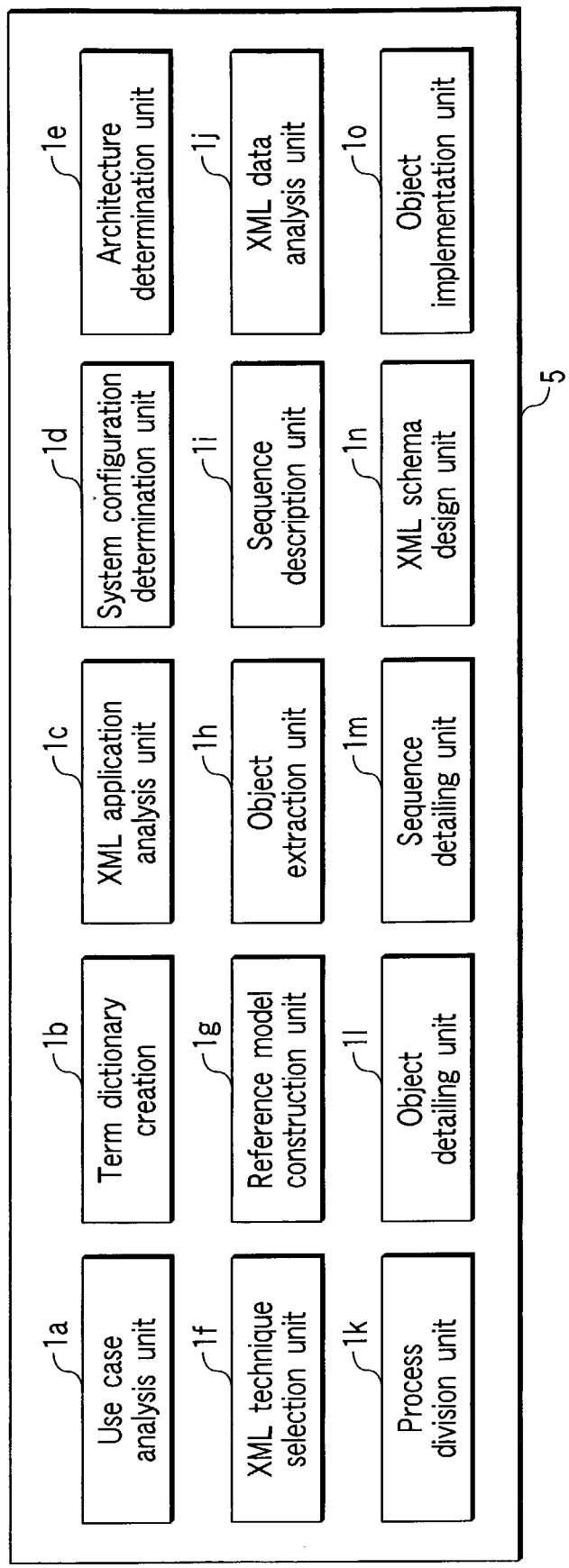
FIG. 2 is a block diagram showing examples of units comprised in the system development support system according to the first embodiment.

FIG. 2 is a block diagram showing examples of units comprised in the system development support system according to this embodiment. Units (logics) 1a to 1o for supporting the respective tasks 91 to 131 are implemented by the processing done by the system development support program 1.

The units 1a to 1o include, for example, a unit for creating various diagrams such as a use case diagram, class diagram, and sequence diagram with a drawing tool which provides a GUI, a unit for displaying information requested by the system developer, and a unit for supporting the creating of a program with a programming tool.

Figure 3:
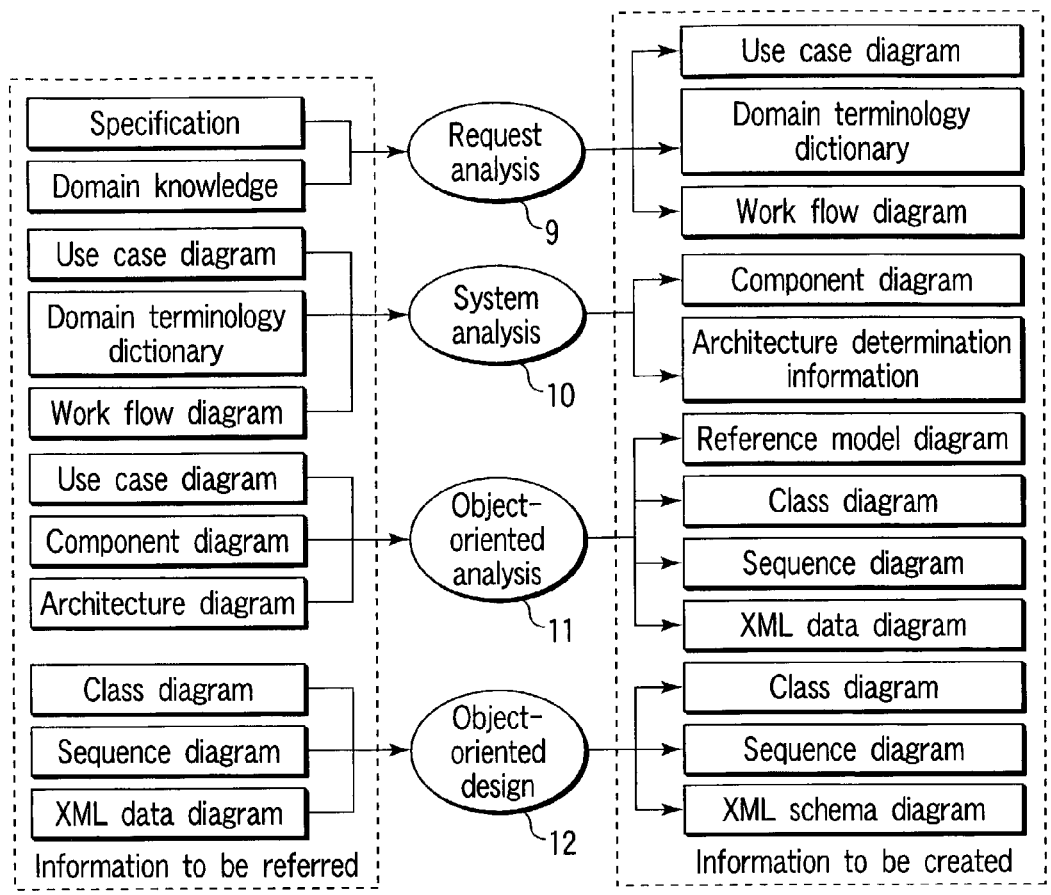
FIG. 3 is a view showing an example of the relationship between information referred to by a system developer and information created by the system developer in each phase of a system development process.

FIG. 3 is a view showing an example of the relationship between information referred to by the system developer in the phases 9 to 12 of the system development process 2 and information created by the system developer in the phases 9 to 12.

The information referred to by the system developer in the phases 9 to 12 is stored in the storage device 7c. The processing section 5 loads the information, and the output section 6 outputs the information. The system developer refers to the output information.

The information created by the system developer in the phases 9 to 12 is input by the input section 4. The processing section 5 stores the input information in the storage device 7c.

Figure 4:
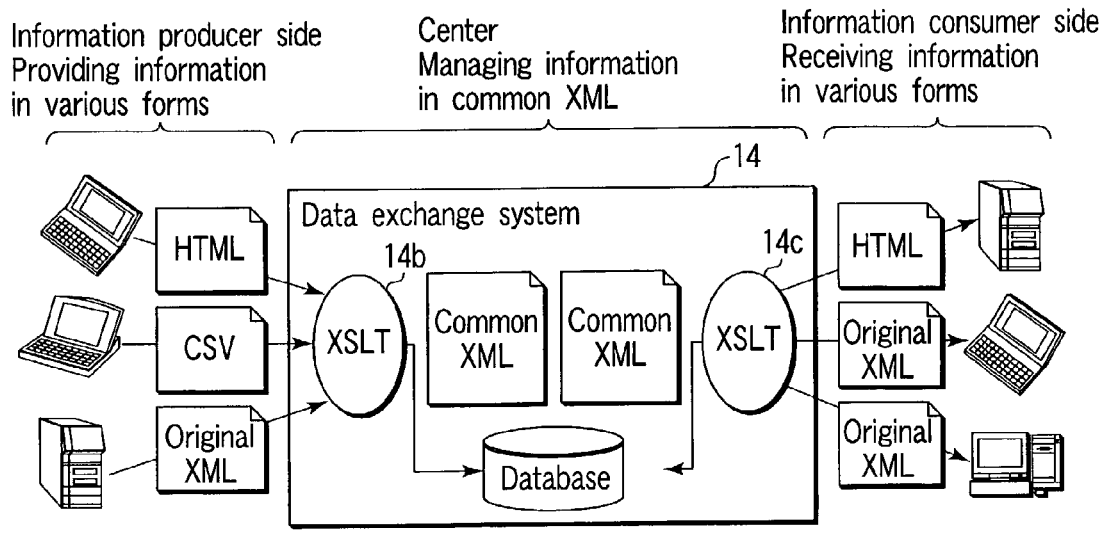
FIG. 4 is a view showing an example of a data exchange system for a news agency, which is a system as a development target.

This embodiment will exemplify a case wherein a data exchange system 14 for a news agency like the one shown in FIG. 4 is developed by using the system development support program 1.

The respective phases 9 to 13 of the system development process 2 will be described below.

In the request analysis phase 9, an external environment to which a system as a development target is applied and the usage of the system are examined, items required for the system as the development target are embodied, and the boundary (systematization range) of the system as the development target is determined.

The information referred to by the system developer in this request analysis phase 9 includes a specification and domain knowledge. The information created by the system developer includes a use case diagram, domain term dictionary, and work flow diagram.

The system developer performs the use case analysis 91, term dictionary creation 92, and XML application analysis 93 in the request analysis phase 9.

In the use case analysis 91, a systematization range is determined on the basis of a specification and domain knowledge, and functional requirements comprised in the system are clarified.

In order to support this use case analysis 91, the use case analysis unit 1a loads the specification and domain knowledge from the storage device 7c to present them to the system developer, presents a window for supporting the creation of a use case diagram to the system developer, and stores the use case diagram created by the system developer in the storage device 7c.

Figure 5:
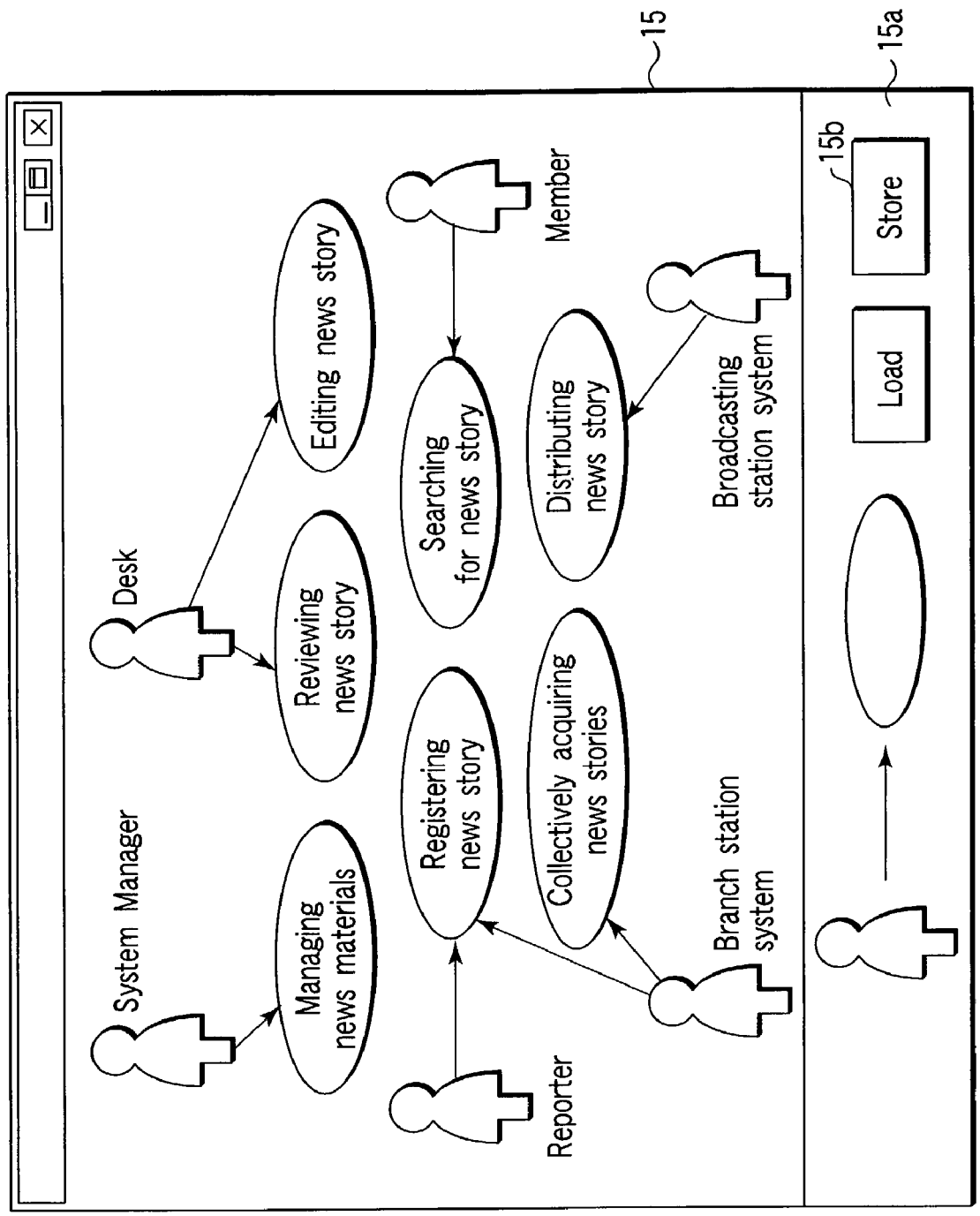
FIG. 5 is a view showing an example of a window for supporting use case analysis.

FIG. 5 is a view showing an example of a window for supporting the use case analysis 91.

A window 15 is output from the output section 6. The system developer inputs information for the window 15 through the input section 4. The same applies to other windows to be described below.

The system developer designates a part (a human figure mark, ellipse, arrow, or the like) in a diagram creation parts area 15a by referring to the specification and domain knowledge with a mouse, also designates the layout position of the part, and input a predetermined explanation as a text, thereby creating a use case diagram. On the created use case diagram, each elliptic portion represents a function required for the system as the development target.

When a store button 15b on the window 15 is pressed, the use case diagram created by the system developer is stored in the storage device 7c.

The system developer enumerates the functions (use cases) of the system as the development target to be provided for the system user of the development target, defines specific interactions with the system user or an external system, and expresses the examination result as a use case diagram.

In the term dictionary creation 92, it is checked on the basis of the specification and domain knowledge whether a plurality of terms are redundantly used in the same sense and the same term is used in different senses, and terms used for business operation and their meanings are defined in the form of a domain term dictionary.

In order to support the term dictionary creation 92, the term dictionary creation unit 1b loads the specification and domain knowledge (and the use case diagram if necessary) from the storage device 7c, presents the read information to the system developer, presents a window for supporting the term dictionary creation 92 to the system developer, and registers the defined terms in the domain term dictionary stored in the storage device 7c.

Figure 6:
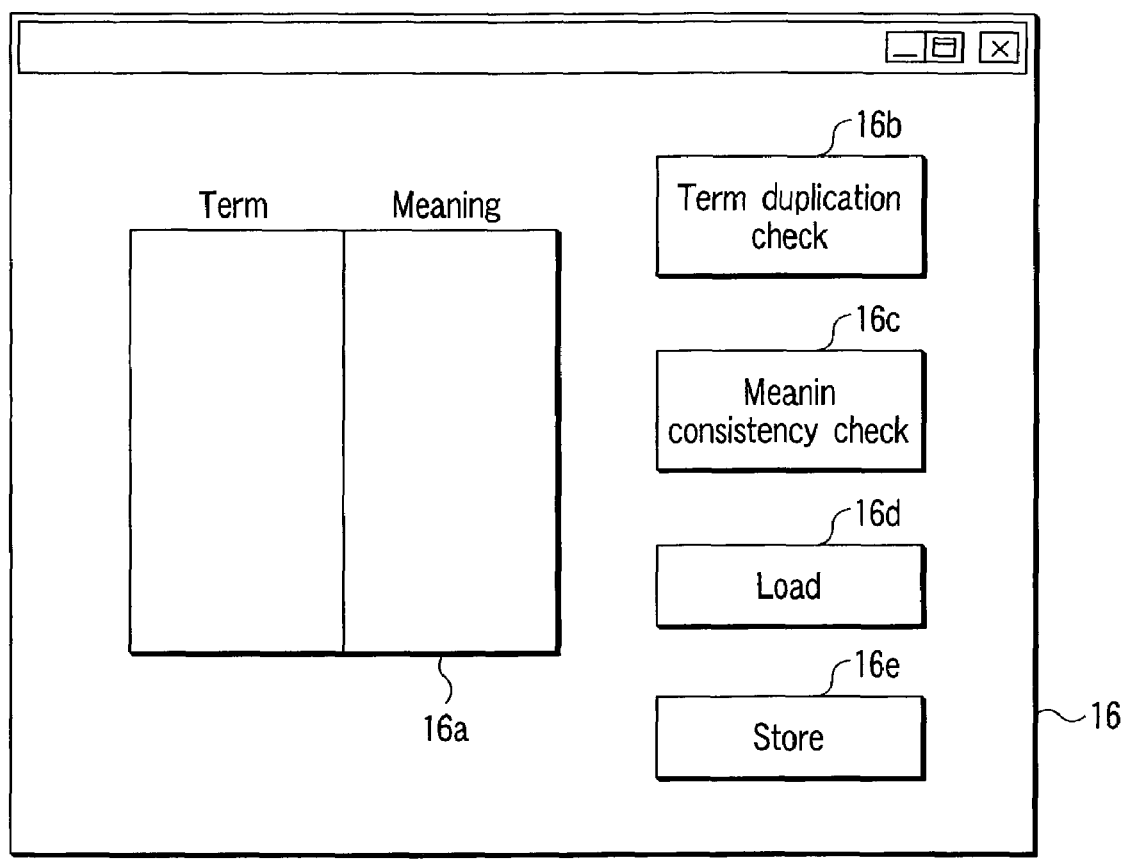
FIG. 6 is a view showing an example of a window for supporting term dictionary creation.

FIG. 6 is a view showing an example of a window for supporting the term dictionary creation 92.

A window 16 includes an area 16a in which a term and its meaning are written in correspondence with each other, a button 16b for checking whether a plurality of terms are redundantly used in the same sense, and a button 16c for checking whether the same term is used in different senses.

When the check button 16b or 16c on the window is pressed, a check corresponding to the button pressed by the system developer is executed. If a store button 16e on the window 16 is pressed, the input term and its meaning are registered in the domain term dictionary.

In the XML application analysis 93, an effective range of XML application is analyzed on the basis of the use case diagram to discriminate a portion to which XML is applied from a portion to which XML is not applied.

For example, XML can be effectively applied to information that is displayed in various forms.

XML can also be effectively applied to document information to be exchanged between systems.

XML can also be effectively applied to information commonly used in a business process flow.

XML can also be effectively applied to information that can be easily handled when it is structured or stratified.

Furthermore, in systematizing business operation, XML can be effectively applied to information that has been exchanged in the form of paper before systematization.

In order to support this XML application analysis 93, the XML application analysis unit 1c loads the use case diagram from the storage device 7c, presents the diagram to the system developer, together with a window for supporting analysis of the effective range of XML application to the system developer, and stores a work flow diagram as an examination result in the storage device 7c.

Figure 7:
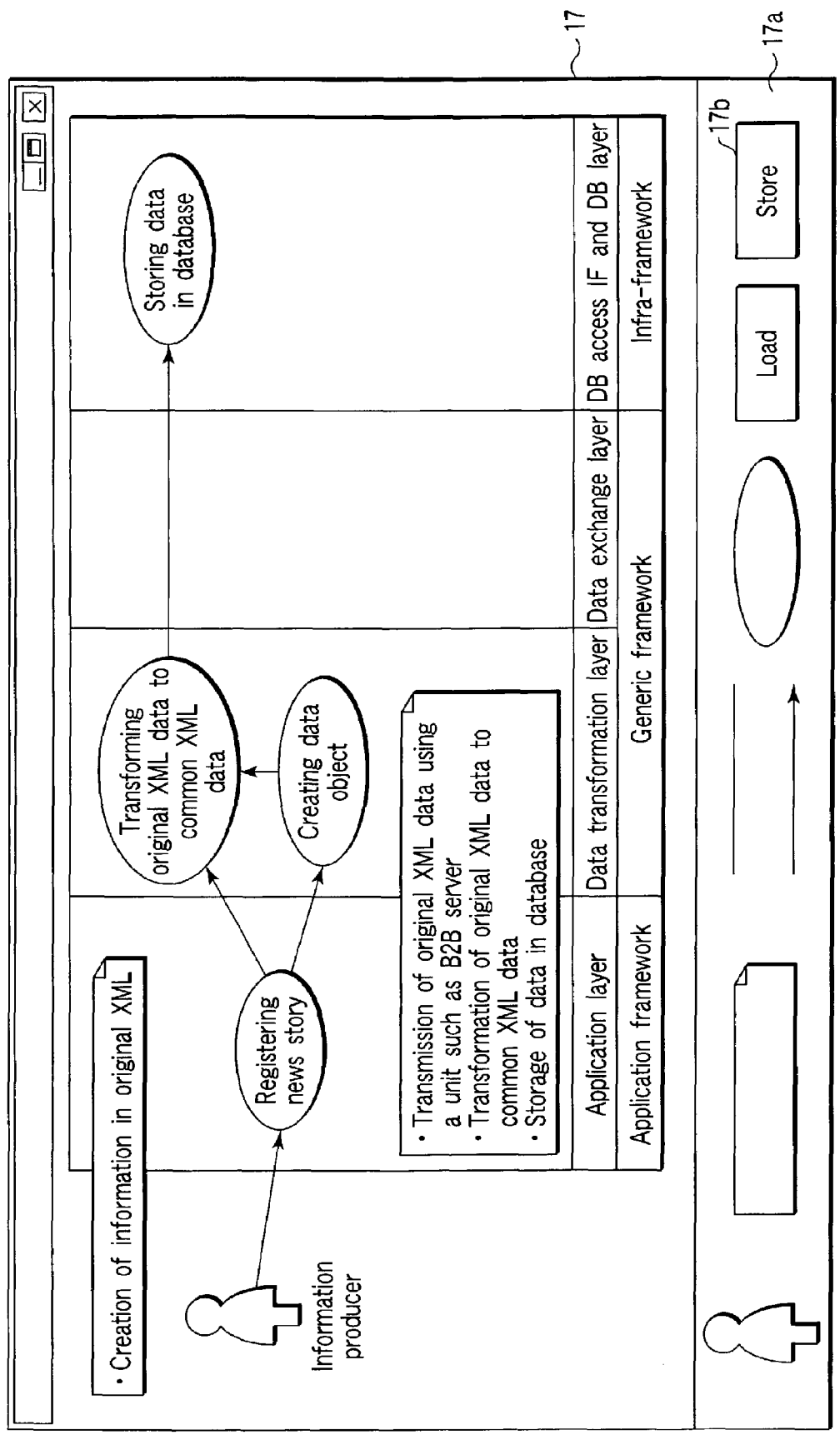
FIG. 7 is a view showing an example of the first window for supporting XML application analysis.

FIG. 7 is a view showing an example of the first window for supporting the XML application analysis 93.

Figure 8:
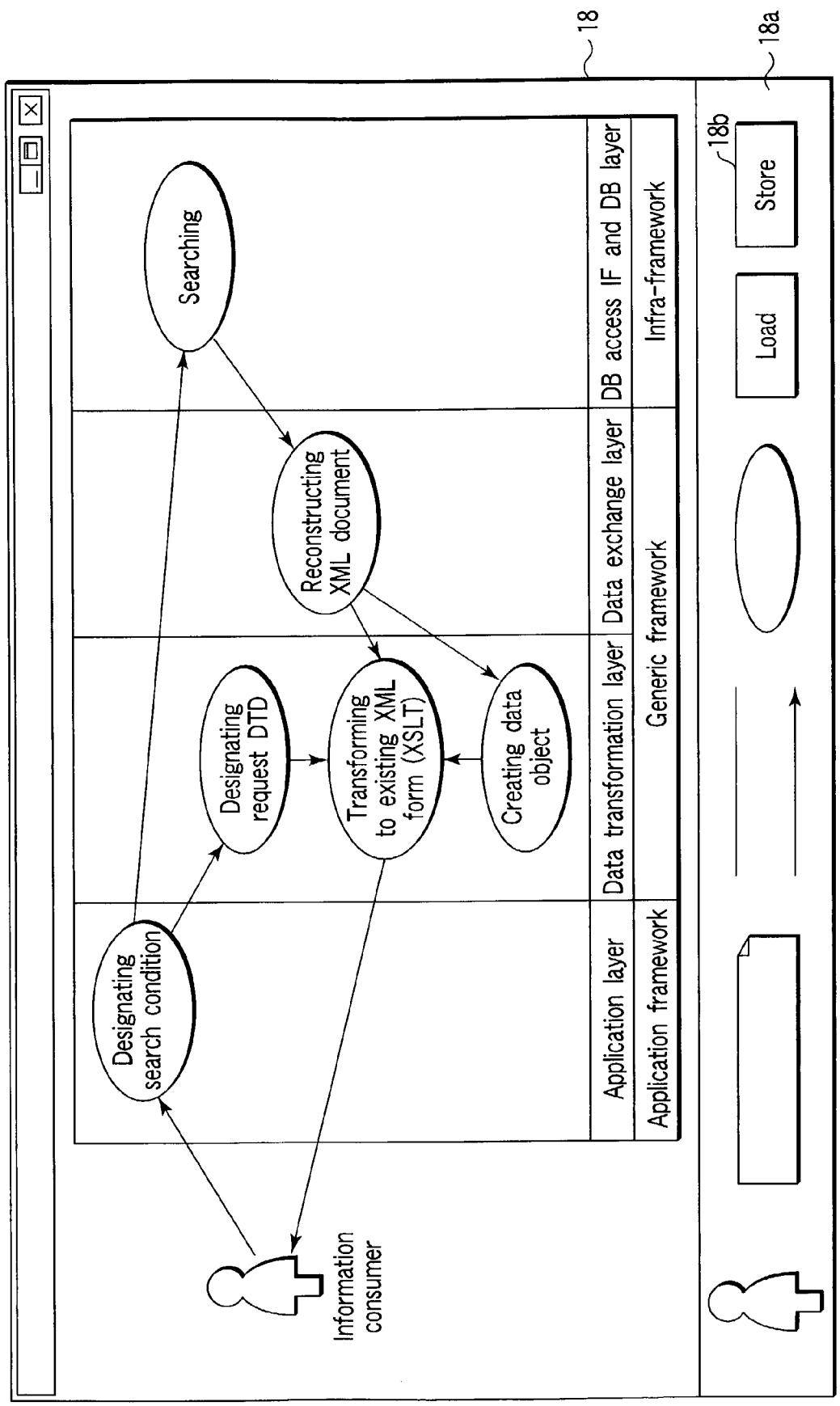
FIG. 8 is a view showing an example of the second window for supporting XML application analysis.

FIG. 8 is a view showing an example of the second window for supporting the XML application analysis 93.

The system developer designates a part (a human figure mark, text input area mark, ruled line, arrow, ellipse, or the like) in a diagram creation parts area 17a or 18a with the mouse, designates a position of the part with the mouse, inputs a predetermined explanation as a text, and analyzes and determines the range of XML application throughout this operation.

When a store button 17b or 18b on a window 17 or 18 is pressed, the work flow diagram created by the system developer is stored in the storage device 7c.

In the XML application analysis 93, the system developer clarifies a portion to which XML is applied and a portion to which XML is not applied, and expresses the examination result as a work flow diagram.

In the system analysis phase 10, the internal structure and operation of the system as the development target are defined from a user's point of view.

The information to be referred to by the system developer in the system analysis phase 10 includes the use case diagram, domain term dictionary, work flow diagram, and architecture information 8. The information created by the system developer includes a component diagram, architecture determination information (architecture diagram), and XML technique selection information.

The system developer performs the system configuration determination 101, architecture determination 102, and XML technique selection 103 in the system analysis phase 10.

In the system configuration determination 101, a configuration at the system level is examined independently of an object-oriented analysis task on the basis of the use case diagram.

In order to support the system configuration determination 101, the system configuration determination unit 1d loads the use case diagram from the storage device 7c, present the diagram to the system developer, together with a window for determining a configuration at the system level to the system developer, and stores the created component diagram in the storage device 7c.

Figure 9:
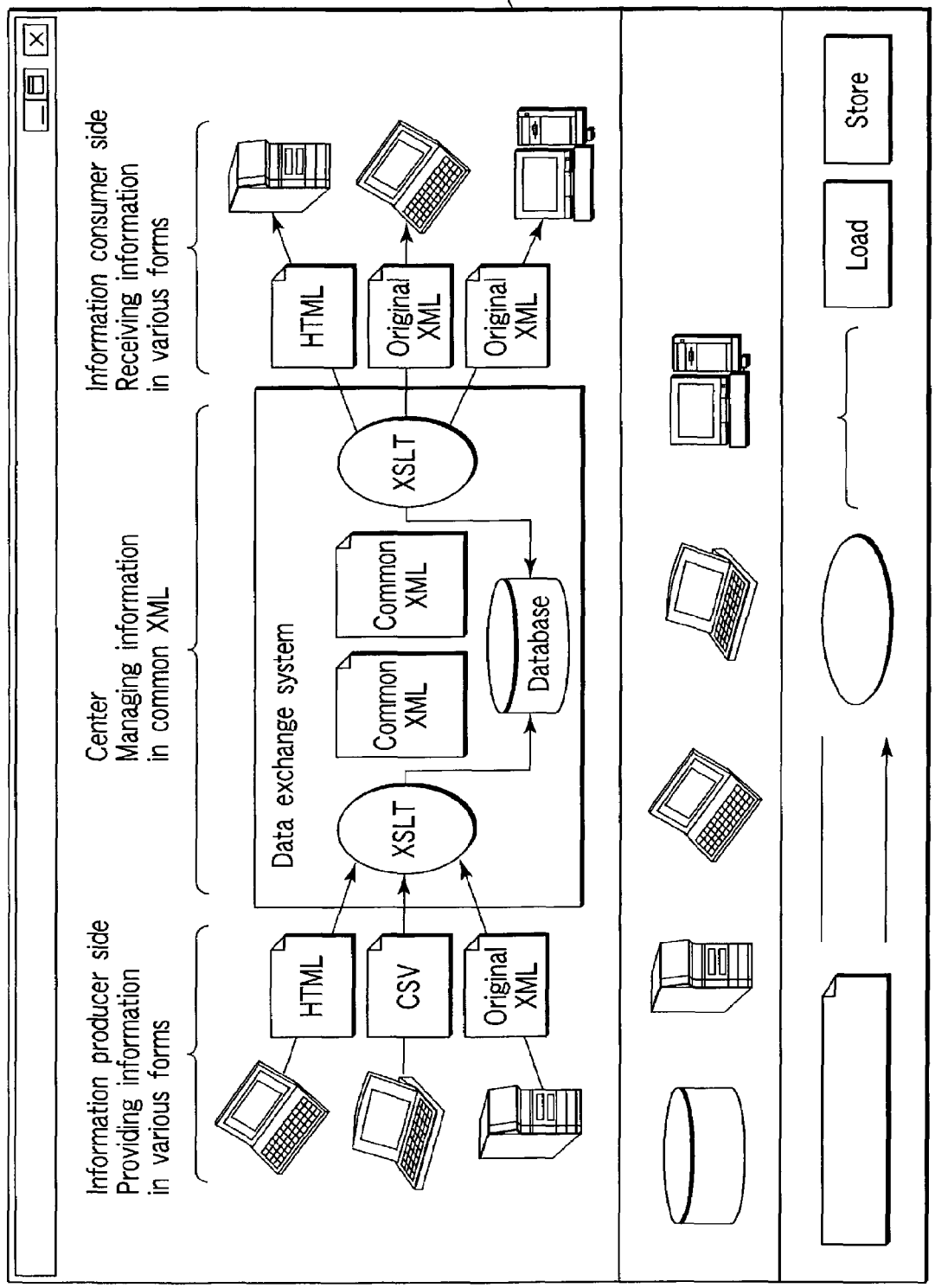
FIG. 9 is a view showing an example of a window for creating a component diagram for determining a configuration at the system level.

FIG. 9 is a view showing an example of the window for creating a component diagram to determine a configuration at the system level.

The system developer examines hardware configuration, software configuration, or the like by referring to the use case diagram. More specifically, the system developer checks whether there is any middleware that can be used or existing software (a framework, component, library, and the like) that can be reused, and examines their availability. The system developer then expresses the examination result as a component diagram.

The framework is the concept of a basic constituent element which is referred in development of a system or application. Software embodied on the basis of this concept may also be called the framework.

In the architecture determination 102, first of all, when the architecture information 8 must be newly created or changed, contents of new creation or change of the architecture information 8 are received, and the architecture information 8 is recorded on the recording medium 7b.

In the architecture determination 102, in the second place, a software configuration is detailed on the basis of the use case diagram, work flow diagram, and architecture information 8.

In order to support this architecture determination 102, the architecture determination unit 1e receives the contents of new creation or change of the architecture information 8, and stores the architecture information 8 in the recording medium 7b.

The architecture determination unit 1e loads the use case diagram and work flow diagram from the storage device 7c, presents them to the system developer, also loads the architecture information 8 from the recording medium 7b, presents a window for software configuration determination to the system developer, and stores the architecture determination information which are the contents determined by the system developer in the storage device 7c.

Figure 10:
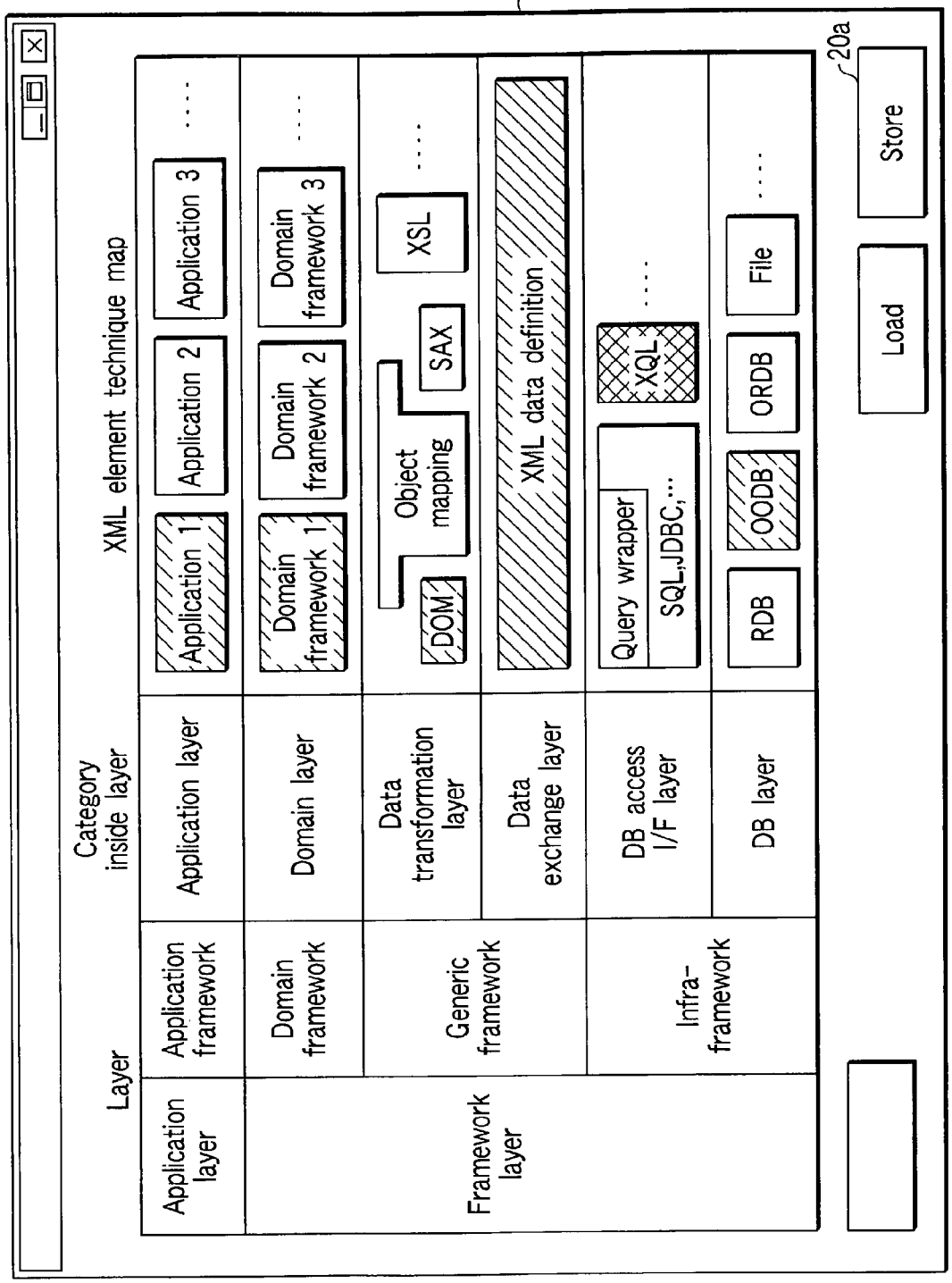
FIG. 10 is a view showing an example of a window for determining a software configuration.

FIG. 10 is a view showing an example of a window for the determination of a software configuration.

The system developer refers to the use case diagram and work flow diagram to designate a desired software program of the software programs displayed on a window 20 on the basis of the architecture information 8.

In order to support the selection task done by the system developer, the architecture information 8 classifies the respective types of software programs into a plurality of items according to the properties, functions, and roles.

In this embodiment, the architecture information 8 classifies the respective types of software programs into an application layer and framework layer.

The framework layer includes a domain framework, generic framework, and infra-framework.

The application layer corresponds to an application layer. The domain framework corresponds to a domain layer. The generic framework includes a data transformation layer and data exchange layer. The infra-framework includes a DB access I/F layer and DB layer.

The architecture information 8 is displayed in the form of a table on the window 20.

When the architecture information 8 is created, the system developer registers the architecture information 8. When the architecture information 8 is updated, the system developer registers the new architecture information 8.

In addition, the system developer refers to the architecture information 8 to determine whether there is any existing framework or software that can be reused on each layer and which part of software should be developed by himself/herself, and clicks the framework or software to be used.

When a store button 20a is pressed, the contents designated by the system developer are stored as the architecture determination information in the storage device 7c.

In the XML technique selection 103, if software associated with an XML technique used for the system as the development target is determined on the basis of the use case diagram and work flow diagram, a technical element to be used is selected from the elements in the "XML element technique map" on a window 20, and a database, tools, and the like are determined.

In order to support the XML technique selection 103, the XML technique selection unit if presents the same selection window as that presented by the architecture determination 102 to the system developer, and stores the contents designated by the system developer as XML technique selection information in the storage device 7c.

In the object-oriented analysis phase 11, a static structural model and dynamic behavior model of the system are determined on the basis of the requirements for the system as the development target which are determined from the use case diagram, component diagram, and the like.

The information referred to by the system developer in the object-oriented analysis phase 11 includes the use case diagram, component diagram, architecture information 8, architecture determination information, and XML technique selection information. The information created by the system developer includes a reference model diagram, class diagram, sequence diagram, and XML data diagram.

In the object-oriented analysis phase 11, the system developer performs the reference model construction 111, object extraction 112, sequence description 113, and XML data analysis 114.

In the reference model construction 111, a reference model to be applied to the system as the development target is determined on the basis of the use case diagram.

The reference model is a standard model for domain object modeling. The reference model represents a logic structure simply expressing a given domain software structure.

In order to support this reference model construction 111, the reference model construction unit 1g loads the use case diagram from the storage device 7c, presents the diagram to the system developer, together with a window for supporting the creation of a reference model diagram to the system developer, and stores the created reference model diagram in the storage device 7c.

Figure 11:
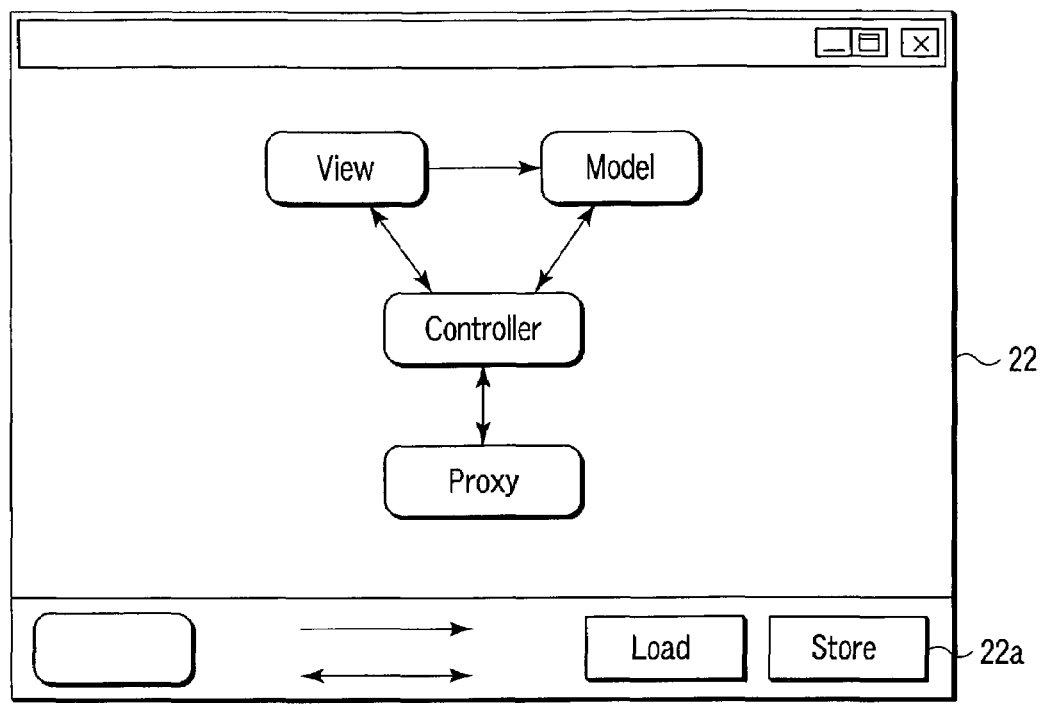
FIG. 11 is a view showing an example of the first window for supporting reference model diagram creation.

FIG. 11 is a view showing an example of the first window for supporting the creation of the reference model diagram.

Figure 12:
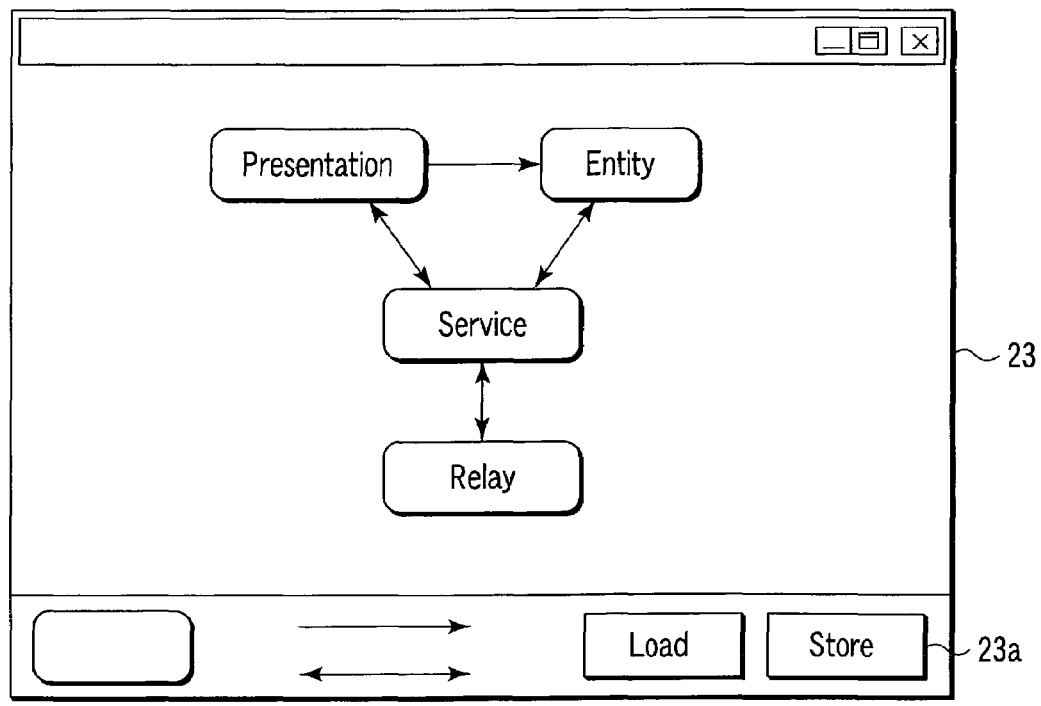
FIG. 12 is a view showing an example of the second window for supporting reference model diagram creation.

FIG. 12 is a view showing an example of the second window for supporting the creation of the reference model diagram.

As a specific example of the reference model, A MVCP (Model-View-Controller-Proxy) model for the supervisory domain described in Japanese Patent Application No. 2000-257815 is available. The reference model diagram of the MVCP model is written on a window 22.

According to the MVCP, software is expressed by "View" associated with a display, "Controller" associated with control, "Proxy" associated with communication, and "Model" associated with data.

A PERS (Presentation-Entity-Relay-Service) model is the reference model similar to the MVCP model. The reference model diagram of the PERS model is written on a window 23.

Simply expressing a software structure is effective for development using an object-oriented technique.

A model element "Entity" in the PERS corresponds to "Model" in the MVCP. A model element "Presentation" corresponds to "View" in the MVCP. A model element "Service" corresponds to "Controller" in the MVCP. A model element "Relay" corresponds to "Proxy" in the MVCP.

Each model element of the reference model represents the viewpoint of extracting objects.

When a store button 22a or 23a on the window 22 or 23 is pressed, the created reference model diagram is stored in the storage device 7c.

In the object extraction 112, objects are extracted on the basis of the reference model diagram created by the reference model construction 111.

In order to support the object extraction 112, the object extraction unit 1h loads the reference model diagram from the storage device 7c, presents the diagram to the system developer, together with a window for extracting objects to the system developer, and stores the created class diagram in the storage device 7c.

Figure 13:
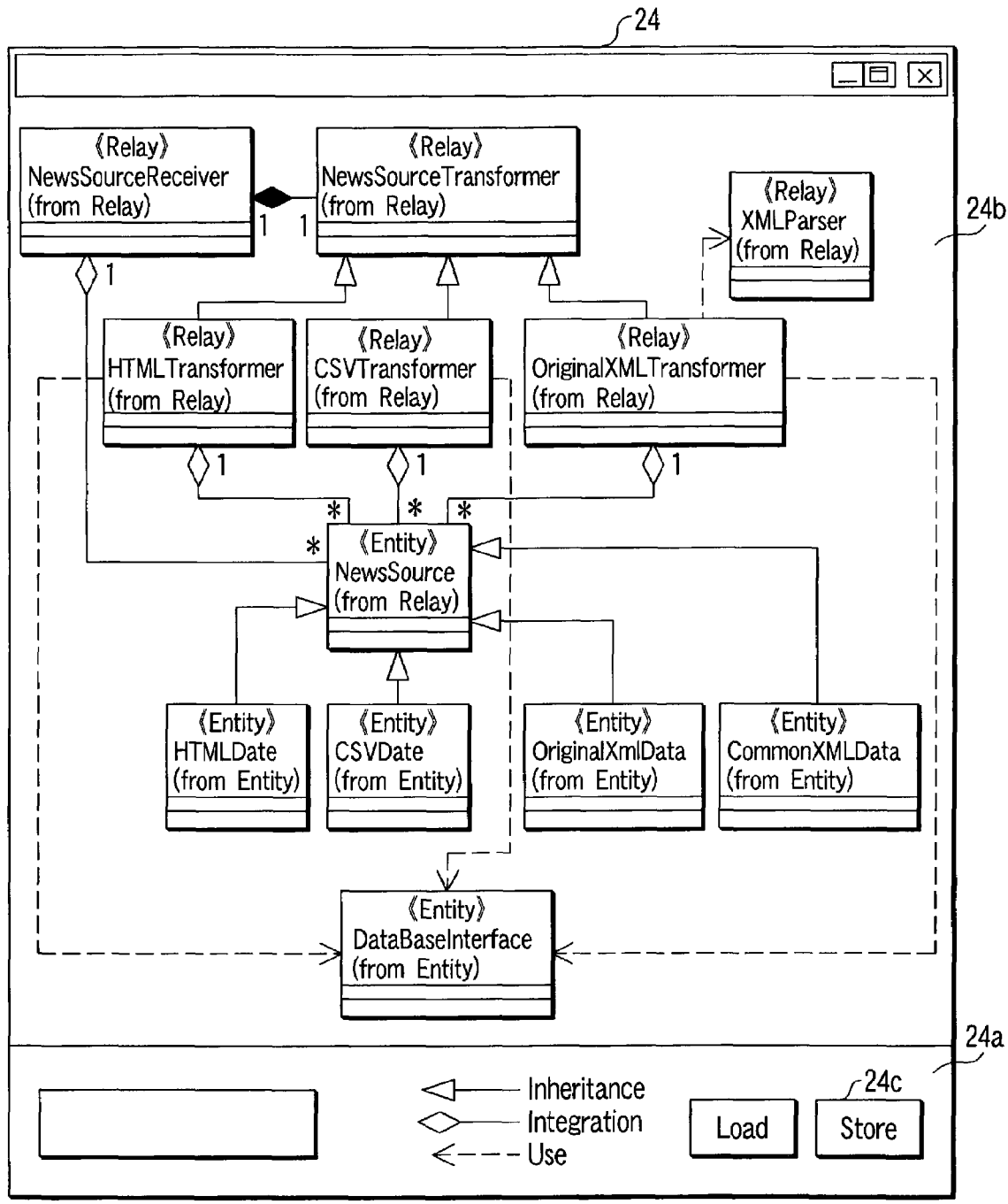
FIG. 13 is a view showing an example of a window for supporting the extraction of an object.

FIG. 13 is a view showing an example of the window for supporting the extraction of objects.

A class icon, concern lines which indicate "inheritance", "integration", "use" and the like which are used to draw the class diagram are prepared in a diagram creation parts area 24a on a window 24.

The system developer designates an element to be included in the class diagram with the mouse by referring to the reference model diagram, and positions it in a drawing area 24b, thereby creating the class diagram. When a store button 24c on the window 24 is clicked with the mouse, the created class diagram is stored in the storage device 7c.

In the case of the PERS model, the system developer extracts objects in accordance with the viewpoints of extracting objects, i.e., "Entity" that expresses data, "Presentation" that provides the user with the information of "Entity" as visual information, "Service" that interprets an input from the user and makes proper adjustment corresponding to "Entity" or "Presentation", and "Relay" that communicates the data to the other party. The class diagram is created on the window 24 on the basis of the examination result, and the created class diagram is stored in the storage device 7c.

In the sequence description 113, after the class diagram is created, operation patterns of the system are enumerated as scenarios, and messages to be exchanged between objects are described as a sequence in chronological order.

In order to support this sequence description 113, the sequence description unit 1i loads the class diagram from the storage device 7c, presents it to the system developer, together with a window for supporting the description of a sequence, and stores the created sequence in the storage device 7c.

Figure 14:
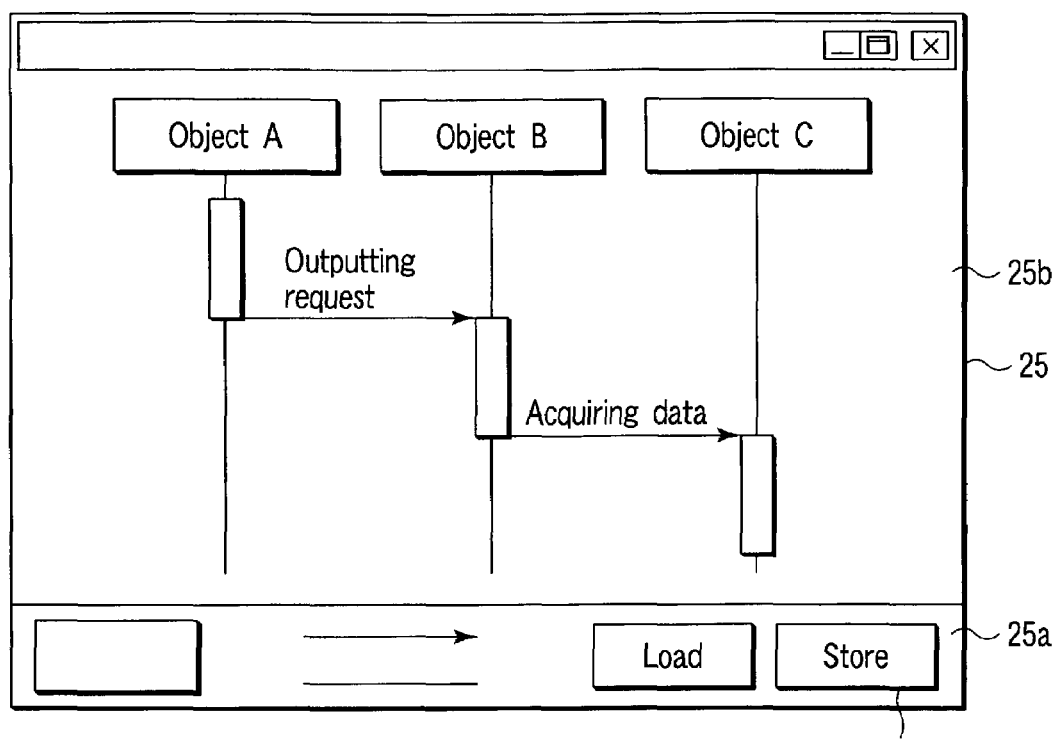
FIG. 14 is a view showing an example of a window for supporting a description of a sequence.

FIG. 14 is a view showing an example of the window for supporting the description of a sequence. An object icon, lines which indicate "message" and "life line" as description elements for the sequence diagram are prepared in a diagram creation parts area 25a on a window 25.

The system developer designates description elements with the mouse, positions them in a drawing area 25b, and inputs names and the like as texts, thereby creating a sequence diagram. When the system developer clicks a store button 25c with the mouse, the created sequence diagram is stored in the storage device 7c.

The object extraction 112 and sequence description 113 are incrementally performed. The system developer repeats the object extraction 112 and sequence description 113 as needed, and gradually refines the results obtained by both tasks.

In the XML data analysis 114, it is checked on the basis of the created class diagram whether the object determined as "Entity" (called a data object) in the object extraction 112 should be described in XML, the logical structure of information determined to be described in XML is clarified, and pieces of information to be expressed are systematically arranged by using a table or the like.

In order to support the XML data analysis 114, the XML data analysis unit 1j loads the class diagram from the storage device 7c, presents the diagram to the system developer, together with a window for describing the logical structure of XML data, and stores the created XML data diagram in the storage device 7c.

Figure 15:
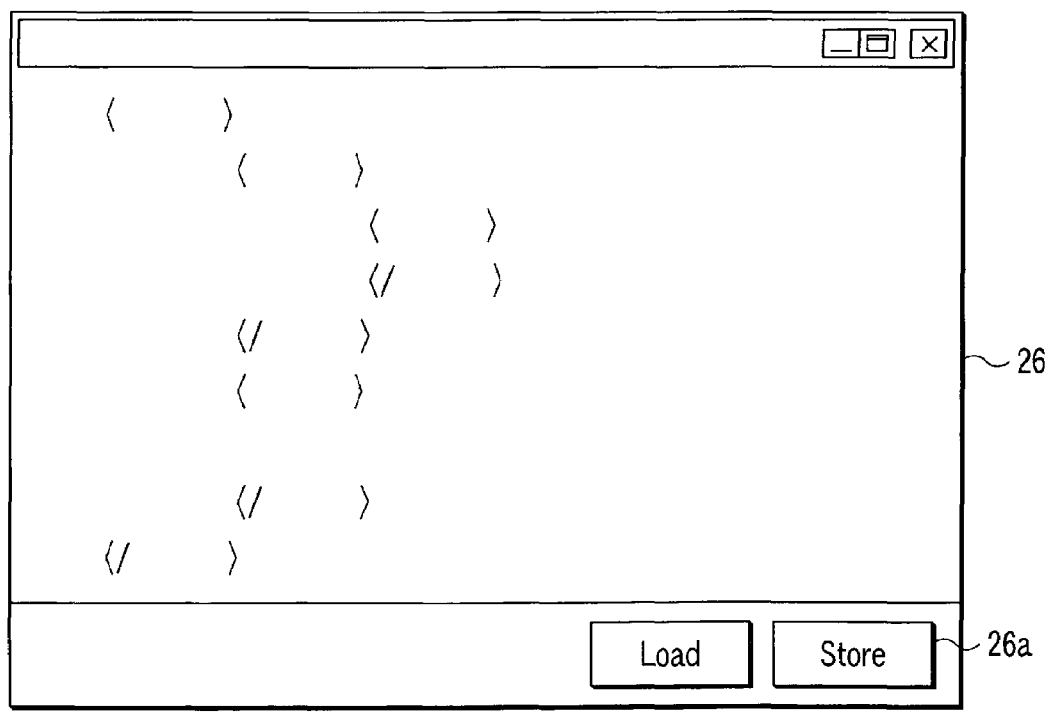
FIG. 15 is a view showing an example of a window for supporting XML data diagram creation.

FIG. 15 is a view showing an example of the window for supporting the XML data analysis 114.

Elements constituting data and their hierarchical relationship are written on a window 26. When a store button 26a on the window 26 is pressed, the described XML data diagram is stored in the storage device 7c.

A criterion by which to determine whether given data should be expressed in XML may be displayed on the window 26 for supporting the XML data analysis 114.

A criterion for a data object to be expressed in XML will be described below.

In system development based on XML, it is checked whether a class (corresponding to "Entity" in a PERS model) associated with data to be expressed as a data object should be handled as XML data.

The following are guidelines used for this determination.

Figure 16:
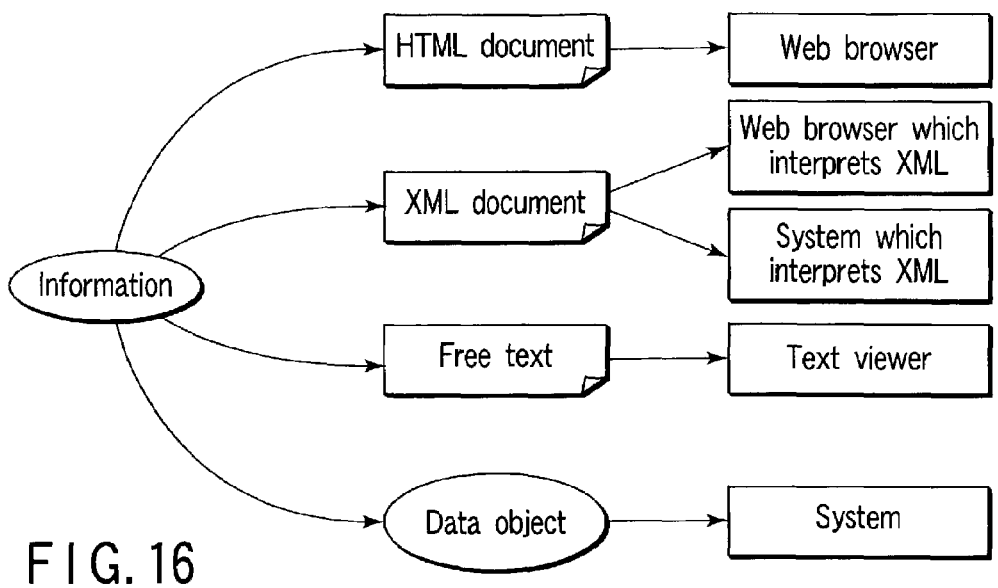
FIG. 16 is a view showing an example of an information expression form.

First, as shown in FIG. 16, information handled in various forms is described in XML.

Second, information that can be easily handled when it is structured is described in XML. For example, various forms in offices can be easily handled upon being structured.

Figure 17:
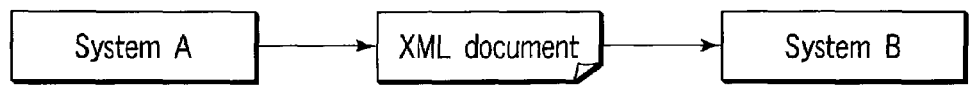
FIG. 17 is a view showing an example of how information is exchanged between systems.

Third, as shown in FIG. 17, information to be exchanged between systems is described in XML.

Figure 18:
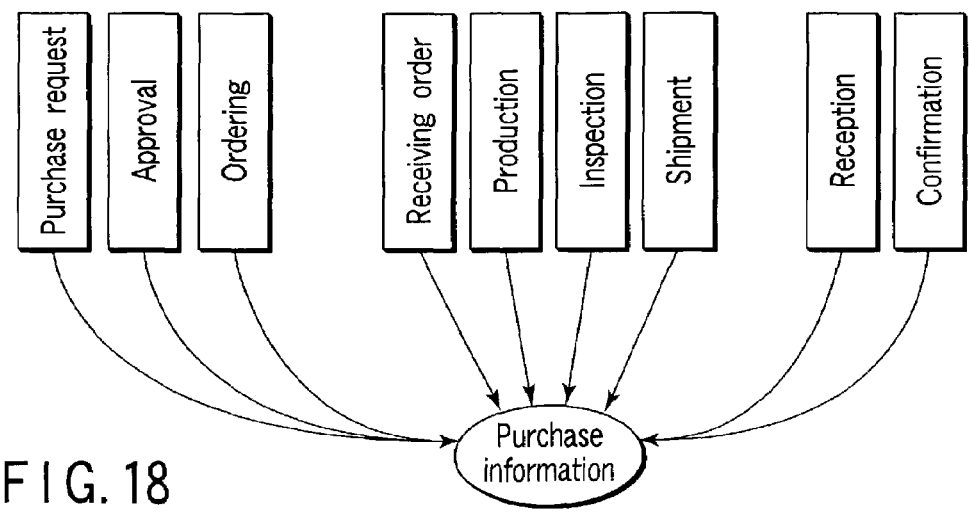
FIG. 18 is a view showing an example of information commonly used in a business operation process flow.

Fourth, as shown in FIG. 18, information that is commonly used in business process flows is described in XML.

The first to fourth types of information can be effectively used in the form of XML data.

In the object-oriented design phase 12, the manner of realizing the model obtained in the object-oriented analysis phase 11 is determined.

In this object-oriented design phase 12, the information referred to by the system developer includes a class diagram, sequence diagram, and XML data diagram. The information created by the system developer includes a detailed class diagram, detailed sequence diagram, and XML schema diagram.

The system developer performs the process division 121, object detailing 122, sequence detailing 123, and XML schema design 124 in this object-oriented design phase 12.

In the process division 121, the parallelism of the system as the development target and the cost of communication between processes are considered on the basis of the class diagram, and the configuration of processes is examined in accordance with technical requirements for the system as the development target.

In the process division 121, the process division unit 1k presents a window similar to the window 24 in FIG. 13 to the system developer to support his/her tasks.

In the object detailing 122, a model of the detailed system, which has a static structure, is created as a detailed class diagram on the basis of the class diagram created in the object-oriented analysis phase 11.

In the object detailing 122, the object detailing unit 11 presents a window similar to the window 24 in FIG. 13 to the system developer to support his/her tasks.

In the sequence detailing 123, the sequence diagram created in the object-oriented analysis phase 11 is detailed in accordance with the object detailing 122. In this sequence detailing 123, consideration is given to a scenario about rare cases such as error processing or abnormal processing, and a sequence about each rare case is described as a detailed sequence diagram.

In this sequence detailing 123, the sequence detailing unit 1m presents a window similar to the window 25 shown in FIG. 14 to the system developer to support his/her tasks.

In the XML schema design 124, schema design corresponding to a data object determined to be expressed in XML is performed on the basis of the class diagram and sequence diagram created in the object-oriented analysis phase 11.

In order to support this XML schema design 124, the XML schema design unit in loads the class diagram and sequence diagram from the storage device 7c, presents the diagrams to the system developer, together with a window for supporting the creation of a XML scheme diagram, and stores the created XML schema diagram in the storage device 7c.

Figure 19:
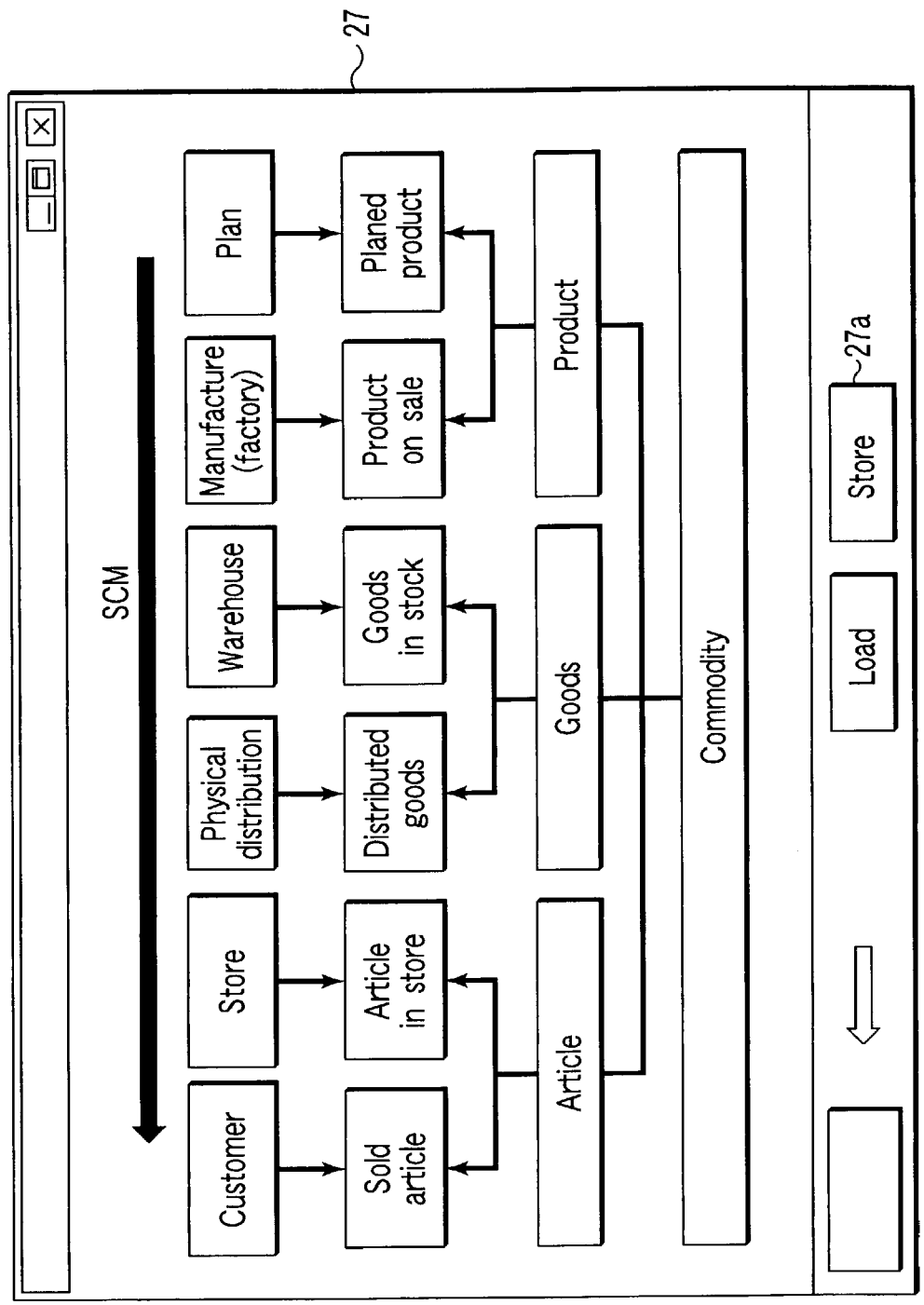
FIG. 19 is a view showing an example of a window for creating an XML schema diagram.

FIG. 19 is a view showing an example of the window for creating an XML schema diagram. The system developer designates and positions parts constituting a schema diagram on a window 27 with the mouse, and inputs text data, thereby creating an XML schema diagram. When a store button 27a on the window 27 is pressed, the described XML schema diagram is stored in the storage device 7c.

A specific technique for the XML schema design 124 will be described below.

When system developers design XML schemas on the basis of their individual know-how, the design schemas differ according to the system developers even if the schemas are based on the same information. In this case, a system may be created, which cannot make full use of the characteristics of XML that is effective in, for example, connecting systems. In order to solve this problem, guidelines for schema design in this embodiment are defined.

The following are examples of several items included in the guidelines for schema design:

[Tag Name]

(1) A schema is defined by attaching a name, as a tag name, which is easy to understand for anyone and is not misunderstood. For example, a schema is defined in full form like "programmer_name" or "president_name" instead of abbreviated form like "p_name".

(2) Item names which have already been used in business operation are used as element candidates in defining a schema. For example, the names of items such as documents and forms are set as element candidates.

[Tag Hierarchy (Document Structure)]

(1) As shown in FIG. 20, if a plurality of items can be handled as a group, these items are grouped by adding a group tag, thereby defining a schema.

(2) A schema is defined by adding a group tag to items which should be grouped in association with business operation.

(3) If there are items which have already been layered (visually) in forms or the like, a schema is defined by using the hierarchical relationship.

(4) As shown in FIG. 19, business operation process flows are clarified, and the manner of handling data in each business operation process is checked. These data are then layered (grouped), as needed, to define a schema.

(5) RDB normalization is used for schema design of XML data. The schema is hierarchically structured by using guidelines for normalization. For example, a schema is defined by clarifying the master/slave relationship between groups.

[Tag Arrangement]

(1) A schema is defined such that tags of the same kind are arranged side by side. For example, a schema is defined by grouping items into resource-related information and event-related information.

Resource-related information is static information such as detailed information of a corporation (the corporation name, address, main telephone number, and the like) or detailed information of a part.

Event-related information is dynamic information such as information used for an ordering process.

[Improvement in Reusability of Schema]

(1) Schema information is divided (normalized) when its reusability is to be improved. However, the schema information need not be divided when its performance is taken into consideration.

(2) Schema definition information is strictly managed as in the case of software parts management, document management, and the like.

[Definition Item as Item to Be Handled as Element or Attribute]

(1) Items defined as items to be handled as elements include, for example, items with a deep hierarchical structure, items whose types and values are not strictly checked, and items in a table such as a form.

(2) Items defined as items to be handled as attributes include, for example, items expressed flat, items which should be strictly checked by an application because their forms cannot be designated, and items such as IDs which are not associated with a table.

[Others]

(1) If a schema definition as an industry standard already exists, a schema is defined in accordance with the industry standard unless there is any special reason.

(2) If it is necessary and possible, a schema is defined by adding a tag to increase search speed.

(3) A schema is basically defined by referring to normalization in an RDB or extraction of data objects in the object-oriented design phase 12.

[Schema Merge]

(1) Schemas are normalized and systematized from a logical viewpoint. That is, a schema is not limited to one type of use (business operation/use case).

(2) Hierarchical groups are determined on an event or process basis. Defining a schema by determining hierarchical groups on an event or process basis is effective in handling a work flow and the like.

(3) Great care should be taken to see that a merged schema has no omission.

In the object-oriented implementation phase 13, the object implementation 131 is performed, and the system as the development target is developed as software by an object-oriented language.

In the object implementation 131, programming by the system developer is supported by the same function as that of a programming tool.

A specific system development technique using the system development support program 1 and architecture information 8 according to this embodiment will be described below.

Note that only main task items in the respective phases 9 to 13 will be described below, while a description of some task items will be omitted. Although the following description is based on the assumption that a system as a development target is the data exchange system 14 for news agencies in FIG. 4, the present invention is not limited to this.

The data exchange system 14 for news agencies, which is the system as the development target, provides a news story provision service for news agencies. More specifically, this system acquires news sources from information producers (reporters), stores them in a database 14a, and provides the stored news for information consumers (newspaper publishers and the like).

The data exchange system 14 for news agencies receives data in a plurality of forms, e.g., HTML (Hyper Text Markup Language), CSV (Comma Separated Value format), and original XML used on the information producer side, from information producers, transforms the data into data in common XML using XSLT (extensible Style Sheet Language Transformation) 14b, and stores the data in the database 14a.

The data exchange system 14 for news agencies extracts common XML information from the database 14a, transforms the information into data in HTML or original XML used by an information consumer by using XSLT 14c, and provides the information for the information consumer.

First of all, the system developer performs the use case analysis 91. In the use case analysis 91, a use case diagram is created. In the use case diagram shown in FIG. 5, functions required for the data exchange system 14 for news agencies are enumerated. The contents of the use case diagram shown in FIG. 5 and an actor associated with the use case diagram will be described below.

The function "registering news story" serves to store a news story from a reporter or a branch office of a news agency in a database.

The function "collectively acquiring news stories" serves to collectively acquire stored news stories from the branch office of the news agency.

The function "searching for news story" serves to search for a news story required by a news publisher or the like joining in the service provided by the data exchange system 14 for news agencies.

The function "distributing news story" serves to distribute a necessary news story to a news publisher or the like joining in the service provided by the data exchange system 14 for news agencies.

The function "managing material" serves to, for example, rank news stories, set prices for them, and display the ranking of the numbers of times that the respective news stories were viewed.

The function "reviewing news story" serves to present the contents of a news story registered by a reporter or the like to allow the desk of a news agency to revise the news story.

The function "editing news story" serves to handle editing operation by the desk of a news agency with respect to the contents of a news story registered by a reporter or the like.

The system developer also performs the term dictionary creation 92. In the term dictionary creation 92, a domain term dictionary is created.

In addition, the system developer performs the XML application analysis 93. In the XML application analysis 93, a work flow diagram inside the system is created on the basis of a use case diagram.

FIGS. 7 and 8 show examples of work flows that were examined. FIG. 7 explicitly shows a system requirement in addition to a use case.

Referring to each of FIGS. 7 and 8, the relationship between the work flow, the architecture information 8 shown in FIG. 10, and the respective layers is also described in a manner easy to grasp. The ellipses in FIGS. 7 and 8 represent the respective elements of the work flows. The contents of these ellipses are executed in the order indicated by the arrows.

FIG. 7 shows a work flow for registering a news story described in original XML. In this work flow, first, a news story is registered by an information producer. Second, the data in original XML is transformed into data in common XML. When XML data is to be handled as an object in the system, data transformation is performed after a data object storing XML data is produced. Third, the XML data is stored in a database.

FIG. 8 shows a work flow for searching for a news story in original XML. In this work flow, a query is input from an information consumer. DTD (Document Type Definition: a kind of schema language) requested by the information consumer is then designated. The database 14a is searched on the basis of the query, and XML data (XML document) that matches the query is loaded from the database 14a into the memory. The found XML data is transformed into data in an XML format unique to the information consumer. If XML data is to be handled as an object in the system, data transformation is performed after a data object storing XML data is produced.

The system developer also performs system configuration determination 101. By the system configuration determination 101, an image diagram of the system configuration shown in FIG. 9 is created as a system for implementing the use case shown in FIG. 5. FIG. 9 shows a state wherein all processing for the data exchange system 14 for news agencies is executed by one computer.

In addition, the system developer performs the architecture determination 102. First, in the architecture determination 102, the system developer defines the architecture information 8 if the architecture information 8 has not been defined yet. Second, the system developer determines an architecture by referring to the architecture information 8. In the architecture determination 102, an architecture required for the data exchange system 14 for news agencies is determined from the architecture information 8 on the window 20 shown in FIG. 10 on the basis of the use case diagram in FIG. 5. The architecture used for the data exchange system 14 for news agencies is highlighted when it is designated by the system developer.

When the data exchange system 14 for news agencies is developed by using the selected architecture as shown in FIG. 10, original XML data received by the data exchange system 14 for news agencies from an information producer is transformed into common XML data that is commonly handled in the system, and is stored as news story information in an OODB (Object-Oriented Database).

The system developer performs the XML technique selection 103. When the data exchange system 14 for news agencies is developed by using the selected architecture as shown in FIG. 10, the data exchange system 14 for news agencies executes access processing for a database by using a DB access IF language called XQL. When common XML data is to be provided for an information consumer by the data exchange system 14 for news agencies, the common XML data is transformed into original XML data suitable for the information consumer, and the resultant data is provided for the information consumer. When XML data is to be handled inside the system, a model called DOM for handling XML data is used.

In addition, the system developer performs the reference model construction 111. By the reference model construction 111, a reference model obtained by modeling the data exchange system 14 for news agencies on the basis of a use case diagram is determined. The data exchange system 14 for news agencies has the following characteristics.

(1) The system has a GUI.
(2) The system exchanges data with external actors such as an information producer and information consumer.
(3) The system needs to process data.
(4) The system needs to store data.

The data exchange system 14 for news agencies therefore uses the PERS model shown in FIG. 12. As described above, "Presentation" provides visual information for an operator thorough a GUI. "Entity" provides data to be processed inside the system. "Relay" serves to perform information communication with an actor and conceal an externally dependent portion. "Service" manages "Entity" and connects "Presentation" to "Entity" to provide a service using the data exchange system 14 for news agencies, and performs information communication with an actor through "Relay", as needed.

The system developer performs the object extraction 112. In the object extraction 112, as shown in FIG. 13, a class structure for implementing the contents of the created use case diagram is described. Referring to FIG. 13, objects for implementing a use case for receiving original XML data from an information producer are described. This class diagram is created on the basis of the PERS model in FIG. 12. The name of a model element is described in each portion surrounded by "<<" and ">>" in FIG. 13, and a class name is described below each model element.

The system developer also performs the sequence description 113. In the sequence description 113, a sequence diagram is created.

The system developer also performs the XML data analysis 114. In the XML data analysis 114, the logical structure of information determined to be described in XML is clarified and systematized.

For example, in the class diagram shown in FIG. 13, OriginalXMLData class and CommonXMLData class are regarded as classes to be expressed as XML data.

The system developer performs the process division 121, object detailing 122, and sequence detailing 123. In the process division 121, object detailing 122, and sequence detailing 123, a process decomposed state is determined, and a detailed class diagram and detailed sequence diagram are created.

In addition, the system developer performs the XML schema design 124. In the XML schema design 124, a schema about data objects to be expressed in XML is designed.

A case wherein the XML schema design 124 is performed with respect to news stories to be distributed through the Web will be described below as a specific example.

Figure 21:
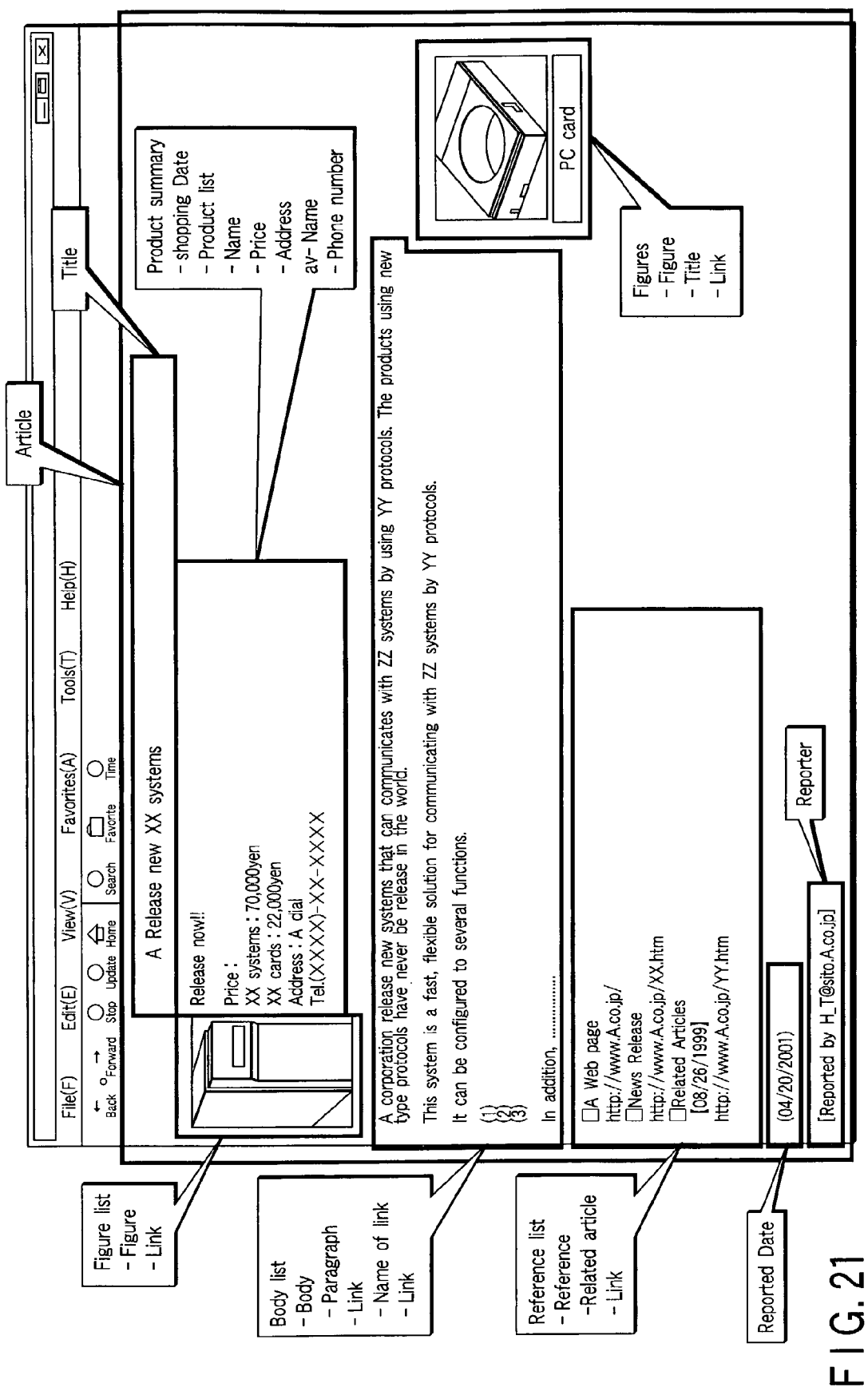
FIG. 21 is a view showing an example of how a news story as design target data for a schema is visually stratified.

First of all, the system developer visually hierarchizes a news story as design target data for a schema, as shown in FIG. 21. The system development support system has a GUI for supporting this hierarchization task.

As shown in FIG. 22, the system developer describes the news story in XML on the basis of this hierarchization operation, and further hierarchizes the news story, as needed.

After the same operation as the above operation is performed for several news stories, a schema is designed by abstracting the operation results.

Figures 23, 24:
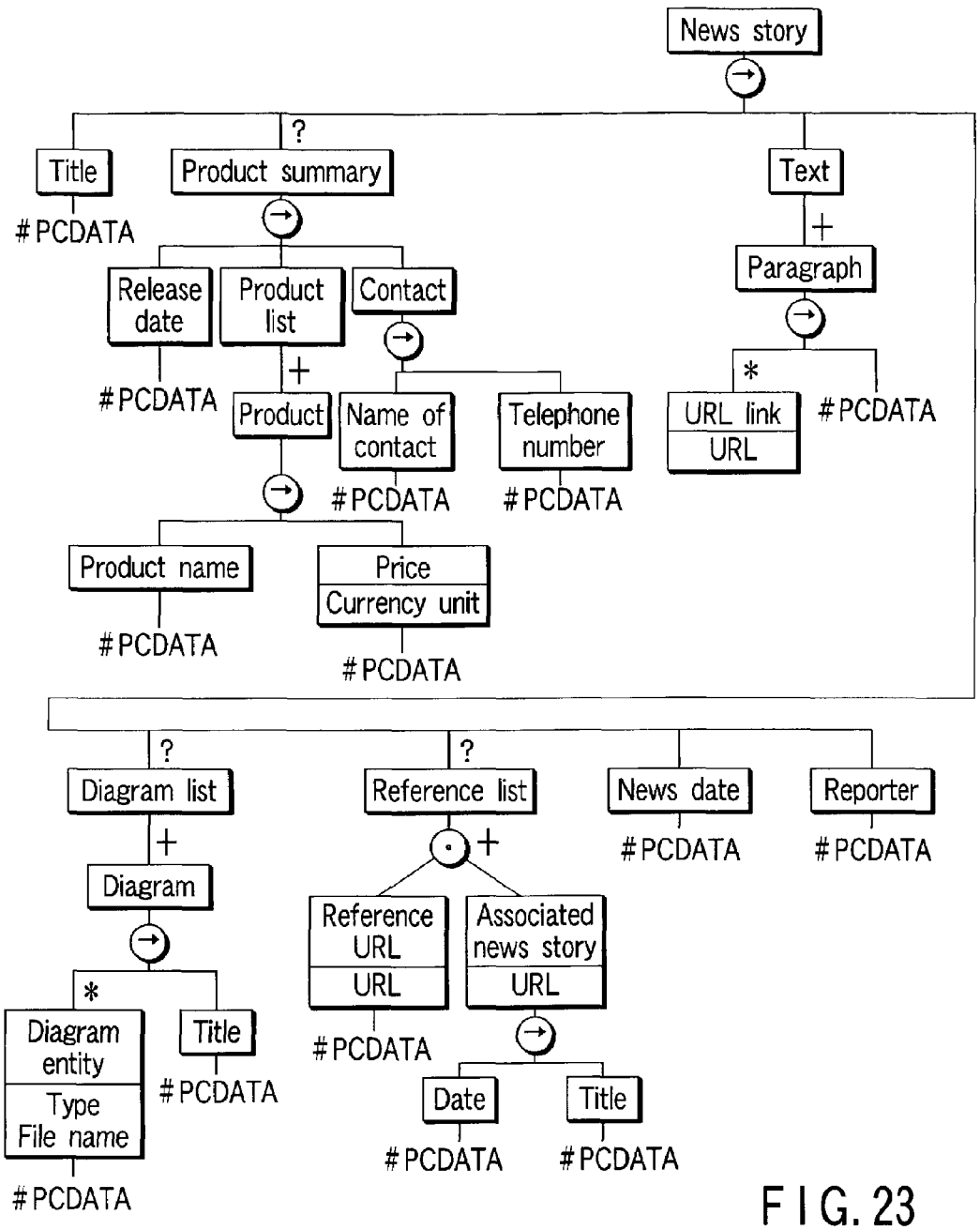
FIG. 23 is a view showing an example of how a news story to be distributed is expressed in a tree structure.
FIG. 24 is a view for explaining the notation for a data structure.

Referring to FIG. 23, the news story to be distributed in this case study is expressed in a tree structure. FIG. 24 shows notational explanations. FIG. 25 shows a case wherein the designed schema is implemented by DTD.

As described above, by developing a system in accordance with the system development process 2 executed by the system development support system according to this embodiment, determination of an architecture that handles structured data is supported, and hence a system to which structured data is applied can be easily and efficiently developed.

In the system development support system according to this embodiment, the architecture information 8 is presented to the system developer. This allows the system developer to easily select software that can be reused, thus reducing the labor required for development.

In addition, the tasks of determining various items for a portion to which XML is applied in accordance with system development are supported. This makes it possible to effectively use XML in a system as a development target.

Second Embodiment

The architecture information 8 described in the first embodiment will be described in detail in the second embodiment.

The architecture information 8 has two items, namely a framework layer and application work layer, as shown in FIG. 10.

The framework layer includes an infra-framework, generic framework, and domain framework.

The infra-framework is a framework associated with a function dependent on an infrastructure. The infra-framework includes a DB layer and DB access I/F layer.

The DB layer is a layer including a database such as an OODB itself.

The DB access I/F layer is a layer including SQL and XQL (database access languages for XML) and a query wrapper wrapping these query languages.

The generic framework is a framework corresponding to a function that is generally used regardless of the domain. The generic framework includes a data exchange layer and data transformation layer.

The data exchange layer is a layer that expresses permanent XML data stored in the database as XML data in the memory.

The data transformation layer is a layer that transforms XML data in the memory into an original schema definition and transforming the XML data into a data object by using DOM (Document Object Model), SAX (Simple API for XML), or the like.

The domain framework is a framework that implements a function dependent on the domain (business operation). The domain framework includes a domain layer.

The domain layer is a layer that implements an application logic. The domain layer is based on the assumption that XML data from an application is used in the form of a data object.

The application layer, application framework, and application layer indicate portions customized on the basis of the functions implemented by the framework layer.

As described above, according to the architecture information 8, architectures as parts associated with the XML techniques are classified according to the respective roles. The system developer can select a necessary architecture from each category. This makes it possible to realize efficient development.

Third Embodiment

In this embodiment, XML schema design 124 will be described, which is associated with use cases such as "registration of news story in XML", "management of news story for ranking/pricing", and "display of reference ranking" in the development of the data exchange system 14 for news agencies in FIG. 4.

The system developer performs the XML schema design 124 to create the following XML schema design results concerning "registration of news story in XML", "management of news story for ranking/pricing", and "display of reference ranking".

Figure 26:
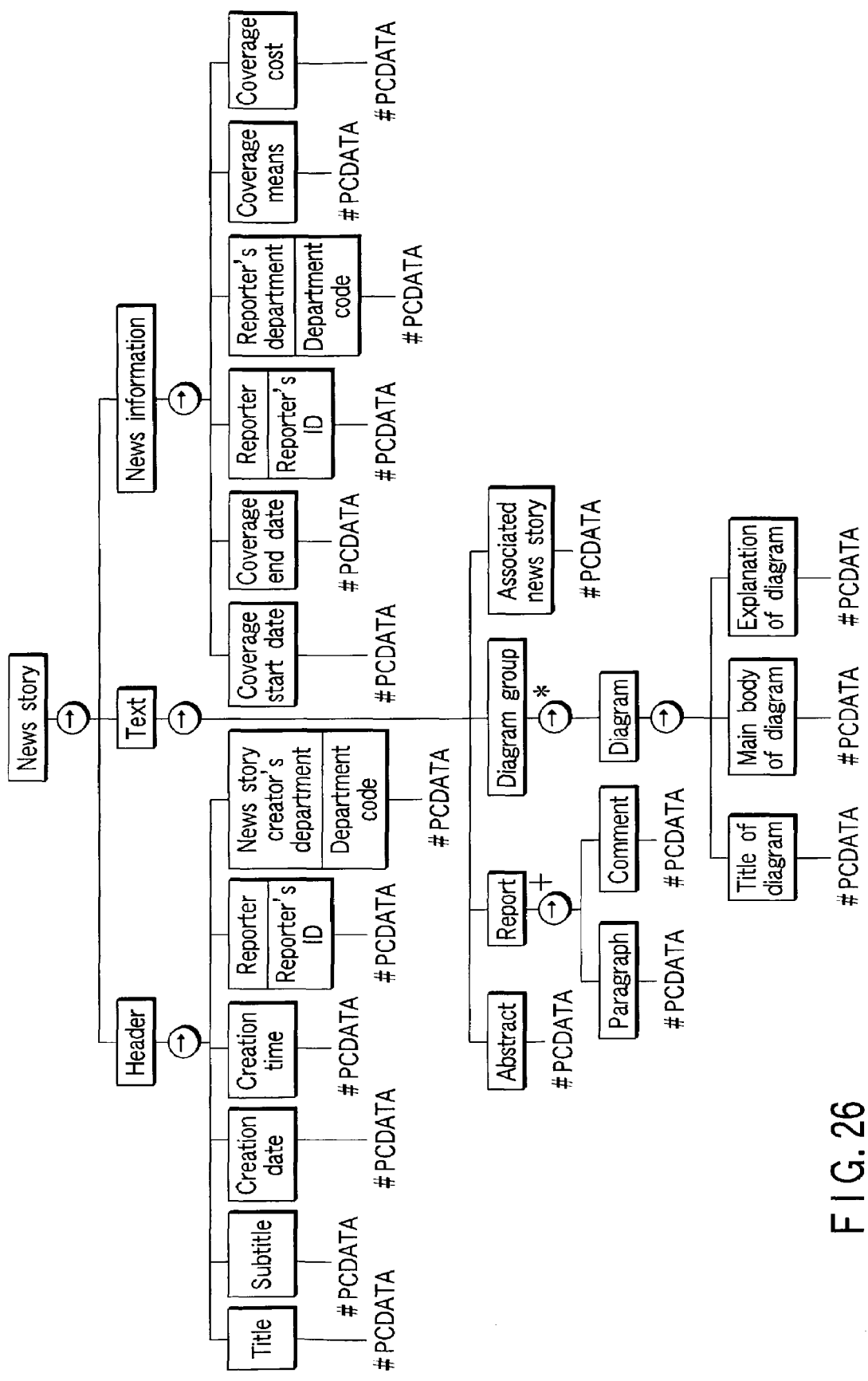
FIG. 26 is a view showing an example of the design result on an XML schema concerning "registration of news story in XML"

FIG. 26 shows the XML schema design result concerning "registration of news story in XML".

FIG. 27 shows the XML schema design result concerning "management of news story for ranking/pricing".

FIG. 28 shows the XML schema design result concerning "display of reference ranking".

As described above, the system developer can easily design XML schemas concerning various use cases by using the system development support system according to the first embodiment.

Fourth Embodiment

A data exchange system 14 for news agencies shown in FIGS. 4 and 9 transforms the received data of each type of schema into common XML data, systematically manages the transformed XML data in a center, and provides the XML data of schemas in accordance with various requests (use cases) from the user.

XML schema design 124 for common XML data managed in the center will be described below.

When the schema of common XML data is to be designed by the XML schema design 124, the respective types of schemas (HTML, CSV, original XML, and common XML) shown in FIG. 4 are integrated.

This integration is also performed in accordance with the guidelines for the schema design described in the first embodiment.

The structure of data can be divided into static information (resource-related information) which is the essential part of a news story and dynamic information (event-related information) viewed from the aspect of a business operation flow (use case). Data are structured with reference to a use case unit and merged.

FIG. 29 shows an example of the schema of common XML data designed by integrating various types of XML schemas.

Information located around the middle layer of the schema shown in FIG. 29 is resource-related information about a news story. The resource-related information includes the title of the news story, its text, a diagram, and the like.

Information located around the lower layer is event-related information about the news story. The event-related information includes information about the creation of the news story, information about the collection of data, information for the management of the news story, and the like.

As described above, the system developer can easily design the schema of common XML data on the basis of various types of schemas by using the system development support system according to the first embodiment.

Fifth Embodiment

In this embodiment, a framework development support system for supporting the development of a framework serving as a model in developing a system will be described.

Figure 30:
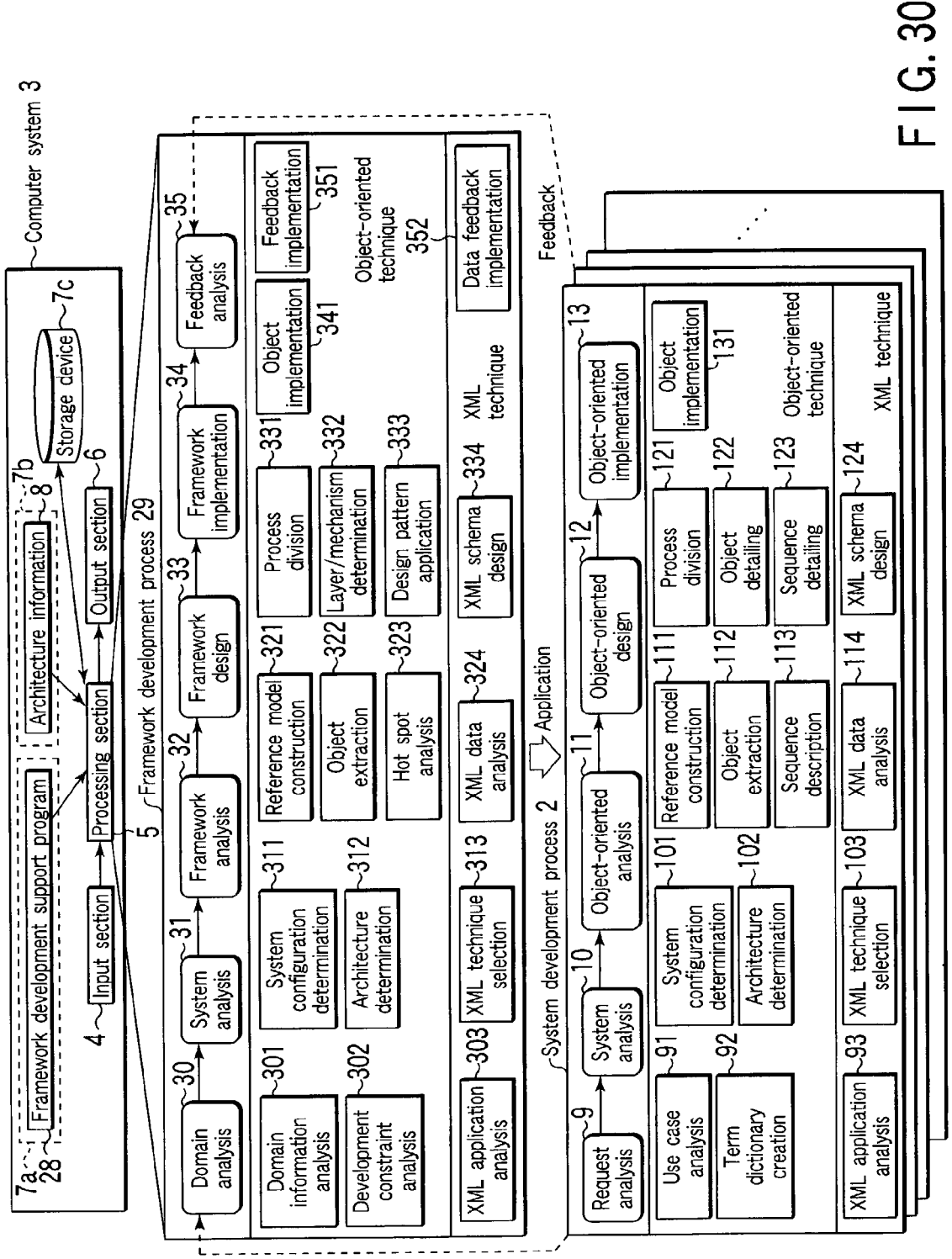
FIG. 30 is a block diagram showing an example of a framework development support system according to the fifth embodiment of the present invention.

FIG. 30 is a block diagram showing an example of the framework development support system according to this embodiment. Note that the same reference numerals as in FIG. 1 denote the same parts in FIG. 30, and a description thereof will be omitted.

A framework development support program 28 supports tasks done by a framework developer in accordance with a framework development process 29.

A processing section 5 loads the framework development support program 28 recorded on a recording medium 7d and executes the corresponding processing.

The data used by the framework development process 29 and the data created by a framework development process 2 are stored in a storage device 7c.

The framework development process 29 executed by the framework development support program 28 is constituted by a domain analysis phase 30, system analysis phase 31, framework analysis phase 32, framework design phase 33, framework implementation phase 34, and feedback analysis phase 35 in the order named.

The tasks performed in the respective phases 30 to 35 mainly include tasks 301, 302, 311, 312, 321 to 323, 331 to 333, 341, and 351 corresponding to object-oriented techniques and tasks 303, 313, 324, 334, and 352 corresponding to XML techniques.

Figure 31:
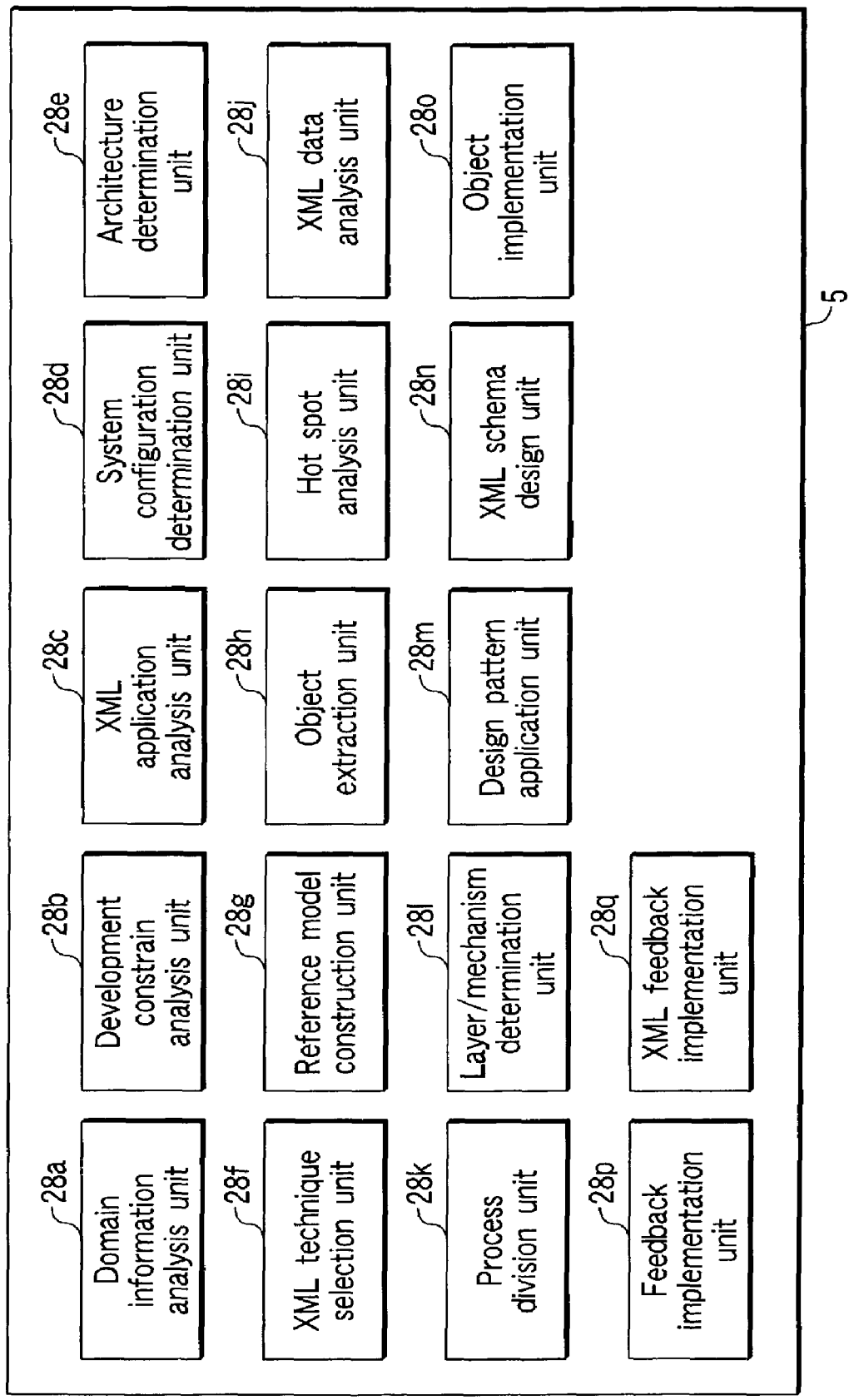
FIG. 31 is a block diagram showing examples of units comprised in the framework development support system according to the fifth embodiment.

FIG. 31 is a block diagram showing examples of units comprised in the framework development support system according to this embodiment. The framework development support system includes units 28a to 28q for supporting the respective tasks 301 to 352 described above. The units 28a to 28q are implemented by the processing done by the framework development support program 28.

The units 28a to 28q include, for example, a unit for creating various diagrams such as a use case diagram, class diagram, and sequence diagram by using a drawing tool which the GUI has, a unit for displaying information requested by the framework developer, and a unit for supporting the creation of a program by using a programming tool.

The respective phases 30 to 35 of the framework development process 29 will be described below.

In the domain analysis phase 30, all the properties of the domain to which the system belongs and various knowledge about development are analyzed.

The framework developer performs the domain information analysis 301, development constraint analysis 302, and XML application analysis 303 in this domain analysis phase 30.

In the domain information analysis 301, a plurality of systems in the domain are analyzed to clarify similarities, commonalities, and differences, business operation knowledge and know-how are described, and the essential properties of the domain are systematized.

In order to support this domain information analysis 301, the domain information analysis unit 28a presents a window for displaying similarities, commonalities, and differences between a plurality of systems such that they can be compared with each other, a window having an area where the essential properties of the domain are systematized and described, and a window having an area where business operation knowledge and know-how are described.

In this case, the plurality of systems to be compared with each other may be systems developed in accordance with the framework development process 2.

The domain information analysis unit 28a stores the contents described by the framework developer by using the respective windows described above in the storage device 7c.

In the development constrain analysis 302, constrains based on conditions for implementation or other dynamic conditions are determined independently of the essential properties of the domain.

In order to support this development constraint analysis 302, the development constraint analysis unit 28b presents a window having an area where determined constraints are described, and stores the described constrains in the storage device 7c.

In the XML application analysis 303, a task similar to the XML application analysis 93 in the above system development is executed in framework development. The framework development support program 28 executes the necessary processing 28c.

In the system analysis phase 31, a step similar to the system analysis phase 10 in the system development is executed for the development of a framework. In the system analysis phase 31, the framework developer performs the system configuration determination 311, architecture determination 312, and XML technique selection 313 on the basis of the know-how obtained in a plurality of system development processes.

In the system analysis phase 31, a standard system configuration applied to a framework and a standard architecture are determined, and an XML technique is selected.

In the framework analysis phase 32, a process that is basically similar to an object-oriented analysis phase 11 in system development is executed to develop a framework. In the framework analysis phase 32, in-depth analysis for the formation of parts is performed.

In the framework analysis phase 32, the framework developer performs the reference model construction 321, object extraction 322, hot spot analysis 323, and XML data analysis 324.

In the reference model construction 321, object extraction 322, and XML data analysis 324, tasks similar to the reference model construction 111, object extraction 112, and XML data analysis 114 in the above system development are executed to develop a framework. The framework development support system includes the reference model construction unit 28g for supporting the reference model construction 111, the object extraction unit 28h for supporting the object extraction 112, and the XML data analysis unit 28j for supporting the XML data analysis 114.

In the hot spot analysis 323, a portion, in the domain, which must flexibly cope with a change in specification or a portion, in the domain, which must flexibly cope with an unpredictable event is specified as a hot spot.

In order to support this hot spot analysis 323, the hot spot analysis unit 28i displays information for determination as to which one of domain information, development constraints, a determined system configuration, architecture determination information, a reference model, and a class diagram as a result of object extraction is used to specify a hot spot.

The hot spot analysis unit 28i also presents a window having an area where a specified hot spot is input, and stores the hot spot input by the framework developer by using this window in the storage device 7c.

In the framework design phase 33, a process that is basically similar to the object-oriented design phase 12 in system development is executed to develop a framework. The framework design phase 33 is characterized in that an implementation as a framework is designed.

In the framework design phase 33, the framework developer performs the process division 331, layer/mechanism determination 332, design pattern application 333, and XML schema design 334.

In the process division 331 and XML schema design 334, tasks similar to the process division 121 and XML schema design 334 in the above system development are executed to develop a framework.

The framework development support system includes the process division unit 28k for supporting the process division 121 and the XML schema design unit 28n for supporting the XML schema design 334.

In the layer/mechanism determination 332, a necessary layer is determined on the basis of the layer for a framework which is located on the second column (the second position from the left) in the architecture information 8 shown in FIG. 10.

In the layer/mechanism determination 332, the mechanism scheme (white box scheme or black box scheme) of each layer is clarified. In the white box scheme, a mechanism such as inheritance or dynamic binding is used. In the black box scheme, an interface capable of plug-in operation is used.

In order to support the layer/mechanism determination 332, the layer/mechanism determination unit 281 loads the architecture information 8 to display it on a window, presents a window having an area where the framework developer inputs the determination result on a mechanism scheme for each layer, and stores the input determination results in the storage device 7c.

In the design pattern application 333, a design pattern is applied to the hot spot extracted by the hot spot analysis 323 to examine a structure with great ease of change.

In order to support the design pattern application 333, the design pattern application unit 28m loads a hot spot from the storage device 7c to display it on a window, and displays an example of a structure with great ease of change on the window.

The design pattern application unit 28m presents a window having an area where the examination result on the structure with great ease of change to which the design pattern is applied is input, and stores the examination result in the storage device 7c.

In the framework implementation phase 34, the object implementation 341 for completing a framework by using a programming language is performed. The object implementation unit 28o supports the object implementation 341.

In the feedback analysis phase 35, the system developed by using the framework completed in the framework implementation phase 34 is examined, and the task of improving the completed framework is supported.

In the feedback analysis phase 35, the framework developer performs the feedback implementation 351 and data feedback implementation 352.

In the feedback implementation 351, the task of improving an object-oriented technique of the framework is supported.

In order to support the feedback implementation 351 and data feedback implementation 352, the framework development support system executes processing similar to that by the object implementation 341 and supports an improvement in the framework.

As described above, by developing a framework in accordance with the framework development process 29 executed by the framework development support system according to this embodiment, determination of an architecture is supported, and a framework for a system to which structured data is applied can be easily and efficiently developed.

By providing the architecture information 8 for the framework developer, in particular, the framework developer can easily select software that can be reused, and hence the labor required for development can be reduced.

In addition, since various items associated with a portion to which XML is applied are determined in accordance with the development of a framework, the framework developer can develop a framework in which XML is effectively used.

Furthermore, the framework developer can properly and easily correct a framework by using the framework development support system according to this embodiment, and hence the labor required for system development can be further reduced.

Sixth Embodiment

The architecture information 8 described in the first and fifth embodiments will be described in detail in the sixth embodiment.

A framework architecture included in the framework layer of the architecture information 8 includes three kinds of frameworks, namely an infra-framework, generic framework, and domain framework.

Figure 32:
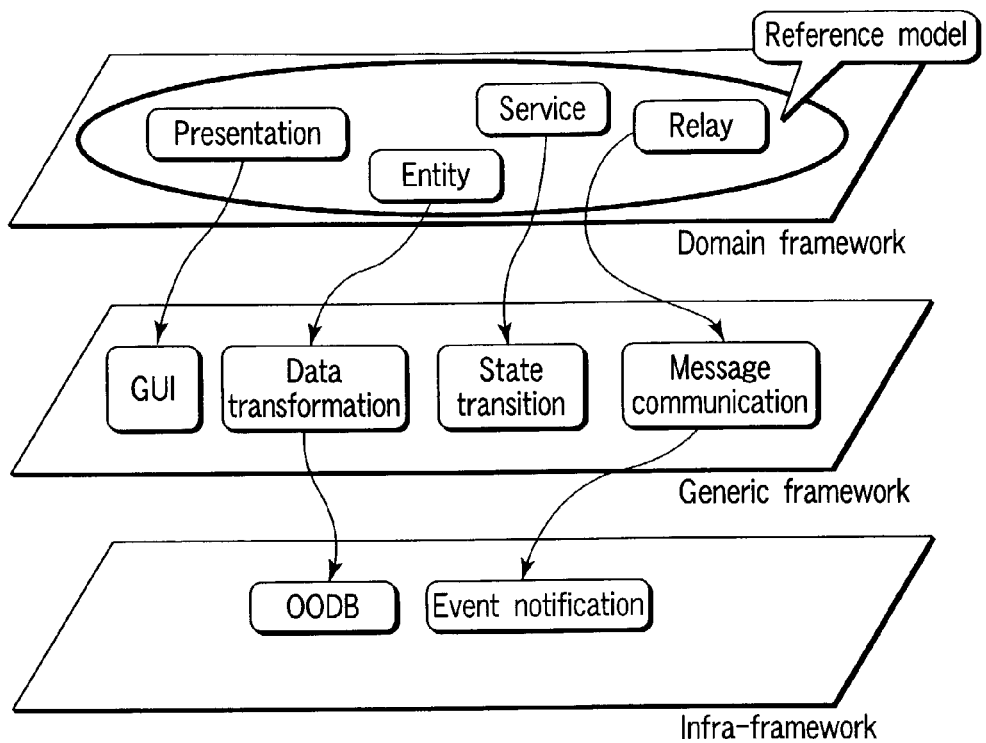
FIG. 32 is a view showing an example of the relationship between a reference model and frameworks.

FIG. 32 is a view-showing an example of the relationship between the reference model and frameworks.

The domain framework provides an element or function that can be applied to a specific domain. Each domain framework is developed on the basis of the reference model. More specifically, examples of the domain framework are a framework for business processing and a framework for a plant. For example, elements to be contained in the domain framework are specified for each business category.

The generic framework provides an element or function that can be applied to a plurality of domains. The generic framework provides, for example, functions for a GUI, state transition, transaction, and message communication.

The infra-framework provides infra-structure services. The infra-framework provides, for example, functions for file access and distributed communication.

Each framework is further classified, as needed.

Figure 33:
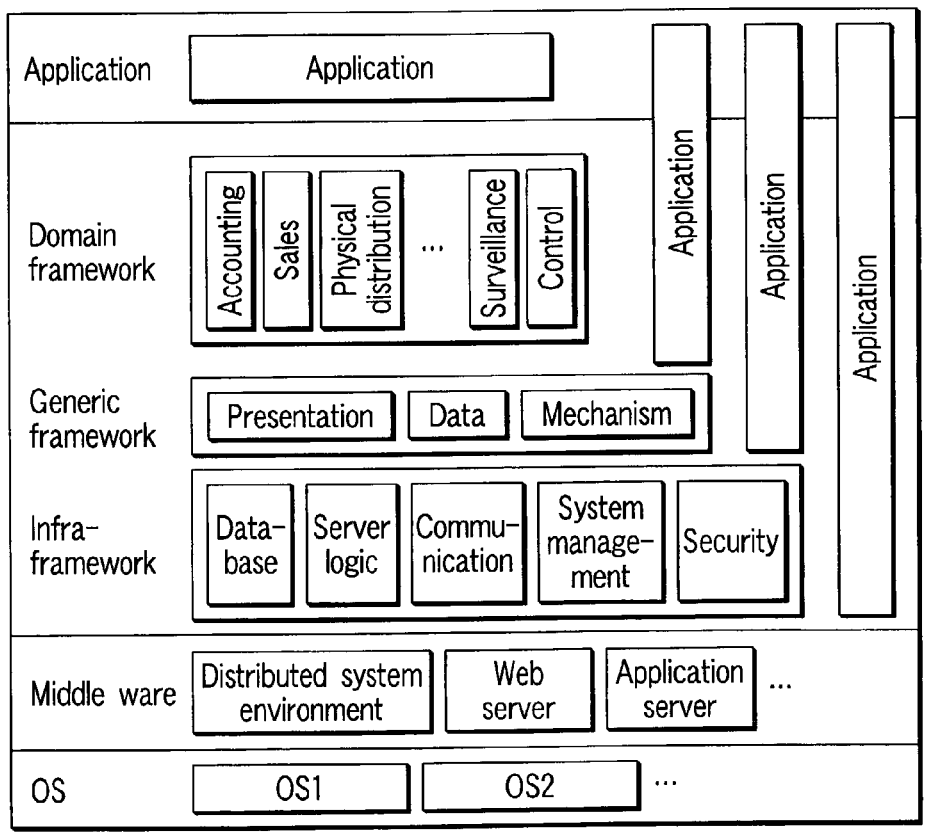
FIG. 33 is a view showing examples of categories in the frameworks.

FIG. 33 is a view showing examples of the categories of each framework.

The domain framework includes various categories such as a surveillance category associated with the execution of surveillance tasks, e.g., surveillance and giving an operation instruction from a remote terminal to surveillance equipment, a control category associated with the operation of executing a service while controlling the operation of a hardware unit, and an accounting category used for accounting.

The generic framework includes categories such as a presentation category associated with "view" of a GUI or the like, a data category associated with data form such as data transformation or form transformation, and a mechanism category associated with a behavior such as state transition or object message communication.

The infra-framework includes categories such as a database category associated with access to permanent data stored in a database such as an OODB or RDB, a server logic category such as "Servlet" executed on an application server, a communication category associated with event notification and message notification as communication means in a distributed environment, a system management category associated with system management such as equipment configuration information, and a security category associated with security, e.g., authentication and access control.

Figure 34:
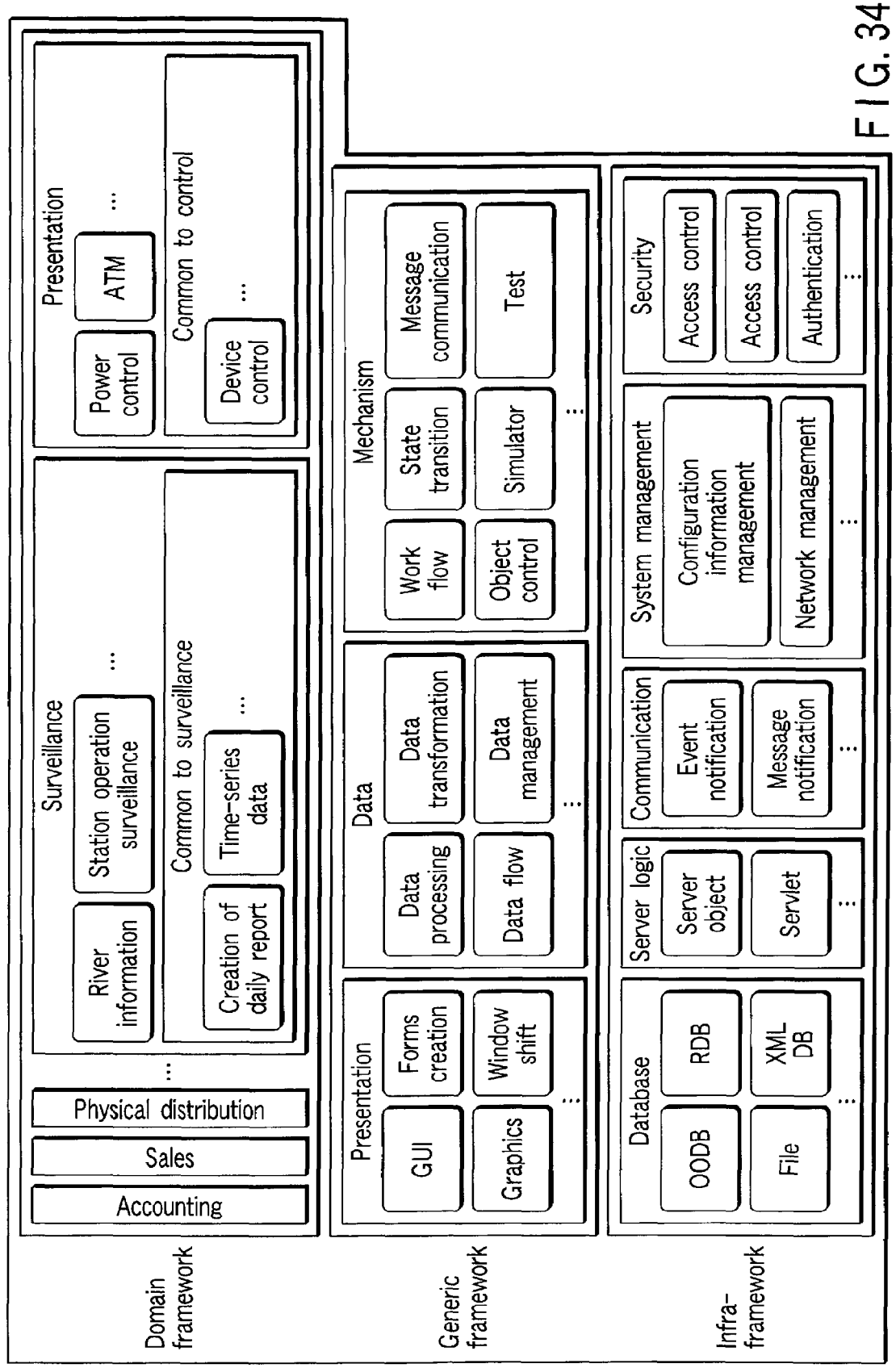
FIG. 34 is a block diagram showing a specific example of how specific software programs are arranged for the respective categories in the frameworks.

FIG. 34 is a block diagram showing a specific example of the specific software programs for the respective categories of the frameworks.

The database category in the infra-framework includes an OODB, RDB, file system, and XML database.

The server logic category includes a server object based on components, software associated with Web/HTML and CGI, and the like.

The communication category includes software associated with various communication protocols such as HTTP, event notification software, and message notification software.

The system management category includes configuration information management software, network management software, and the like.

The security category includes access control software, authentication software, message protection software, non-repudiation software, and security surveillance software.

The presentation category in the generic framework includes GUI software, graphics software, window shift software, form creation software, UI management (UI grouping/framework) software, and the like.

The data category includes data processing software, data flow software, data management software, data transformation (e.g., XML schema transformation framework) software, and the like.

The mechanism category includes object control software, test software, work flow software, transition state software, message communication software, a simulator, and the like.

The surveillance category in the domain framework includes an automatic ticket gate surveillance system framework, station operation surveillance system framework, river information surveillance system framework, expressway surveillance system framework, surveillance common framework, and the like.

The control category includes an ATM (Automatic Teller Machine) system framework, plant control system framework, air conditioning system framework, power control framework, control common framework, and the like.

The domain framework may also include a traffic category, medical category, specific category, and the like.

For example, the traffic category includes a road-related information providing system framework, public traffic information providing system framework, traffic control system framework, ITS image exchange system framework, and the like.

The medical category includes a medical diagnosis system framework, remote medical system framework, hospital information linkage system framework, reservation state management system framework, and the like.

An architecture determination program for determining an architecture by using the architecture information 8 will be described.

FIG. 35 is a block diagram exemplifying the operation state of the architecture determination program. The same reference numerals as in FIG. 1 denote the same parts in FIG. 35, and a description thereof will be omitted.

An architecture determination program 36 is similar to part of the system development support program 1 shown in FIG. 1, and is also similar to part of the framework development support program 28 in FIG. 30.

The architecture determination program 36 makes a computer system 3 function as architecture determination units 1e and 28e.

The computer system 3 reads out the architecture determination program 36 from the recording medium 7a and executes it. The architecture determination program 36 makes the computer system 3 function as a load unit 36a, information output unit 36b, designation acceptance unit 36c, and determination output unit 36d.

The load unit 36a loads the architecture information 8.

The information output unit 36b creates a window 20 on the basis of the architecture information 8 and presents the window 20 to the system developer or framework developer.

The designation acceptance unit 36c accepts the contents designated on the window 20 by the system developer or framework developer. The designation acceptance unit 36c highlights the element designated on the window 20 and accepts an instruction to store the corresponding information in a storage device 7c.

The determination output unit 36d stores the contents designated on the window 20 in the storage device 7c in accordance with the instruction to store.

Figure 36:
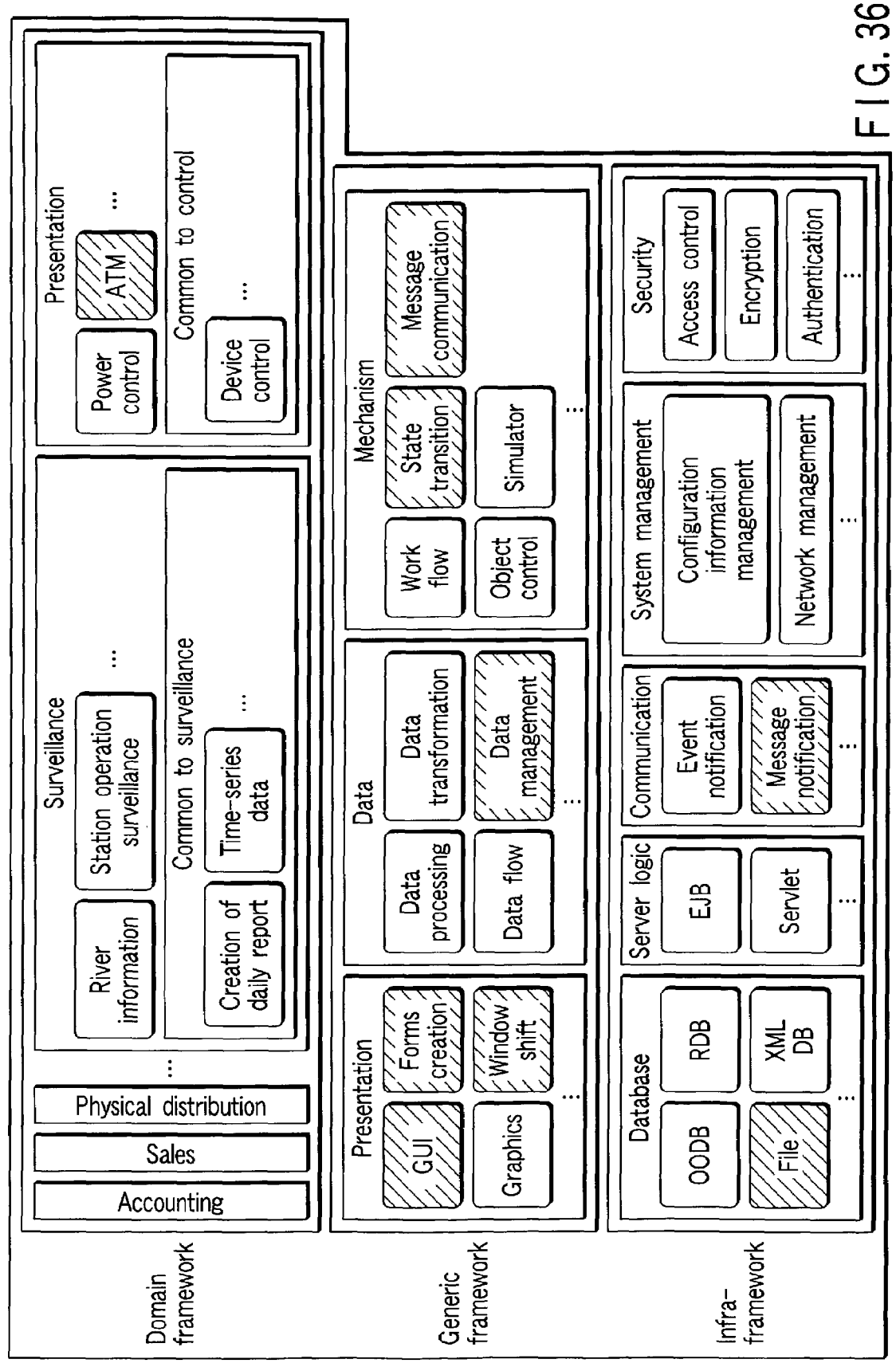
FIG. 36 is a view showing an example of how programs used for an ATM system are designated.

FIG. 36 is a view showing an example of how programs used for an ATM system are designated.

Figure 37:
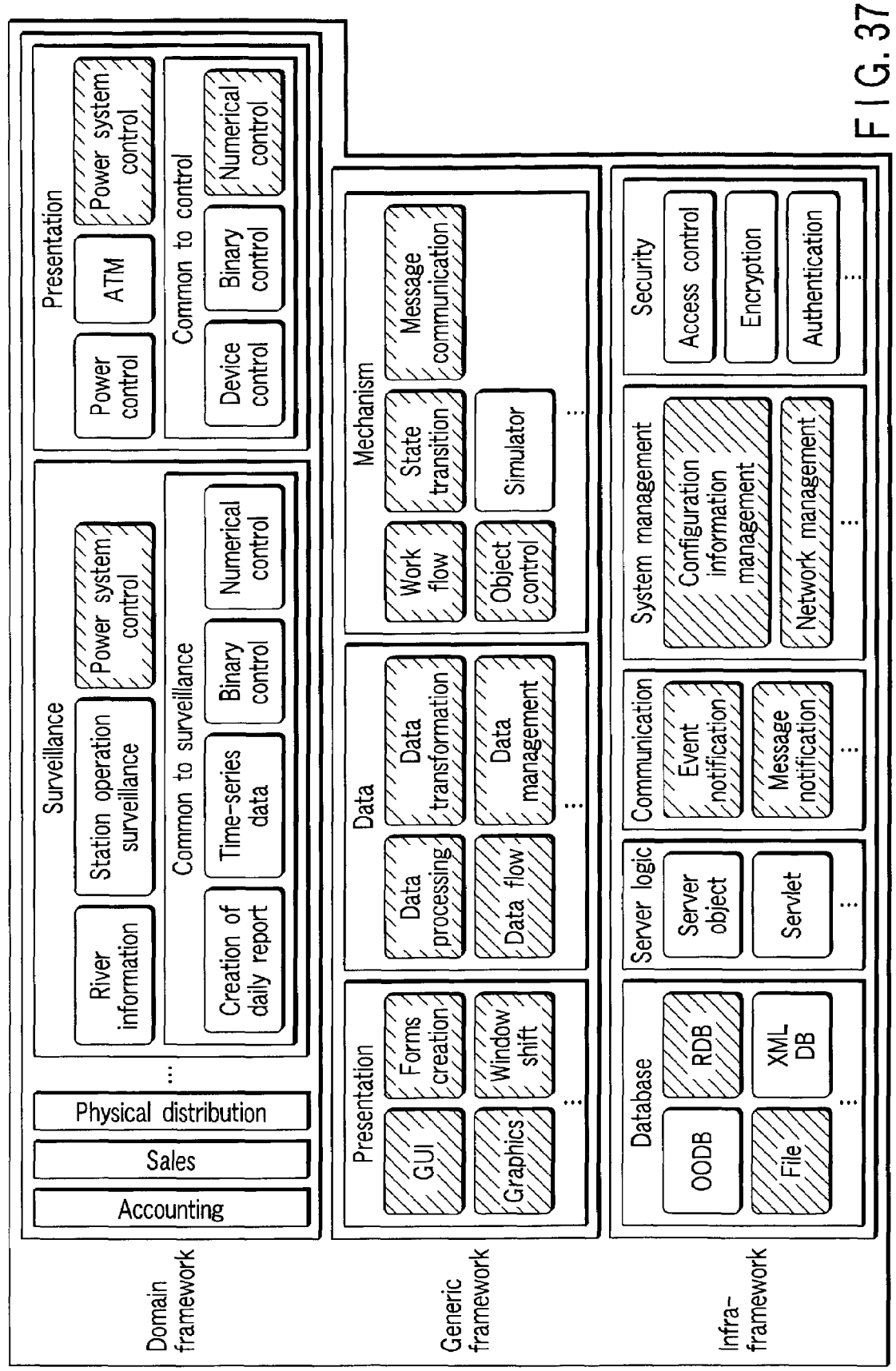
FIG. 37 is a view showing an example of how programs used for a power system surveillance control system are designated.

FIG. 37 is a view showing an example of how programs used for a power system surveillance control system are designated.

Figure 38:
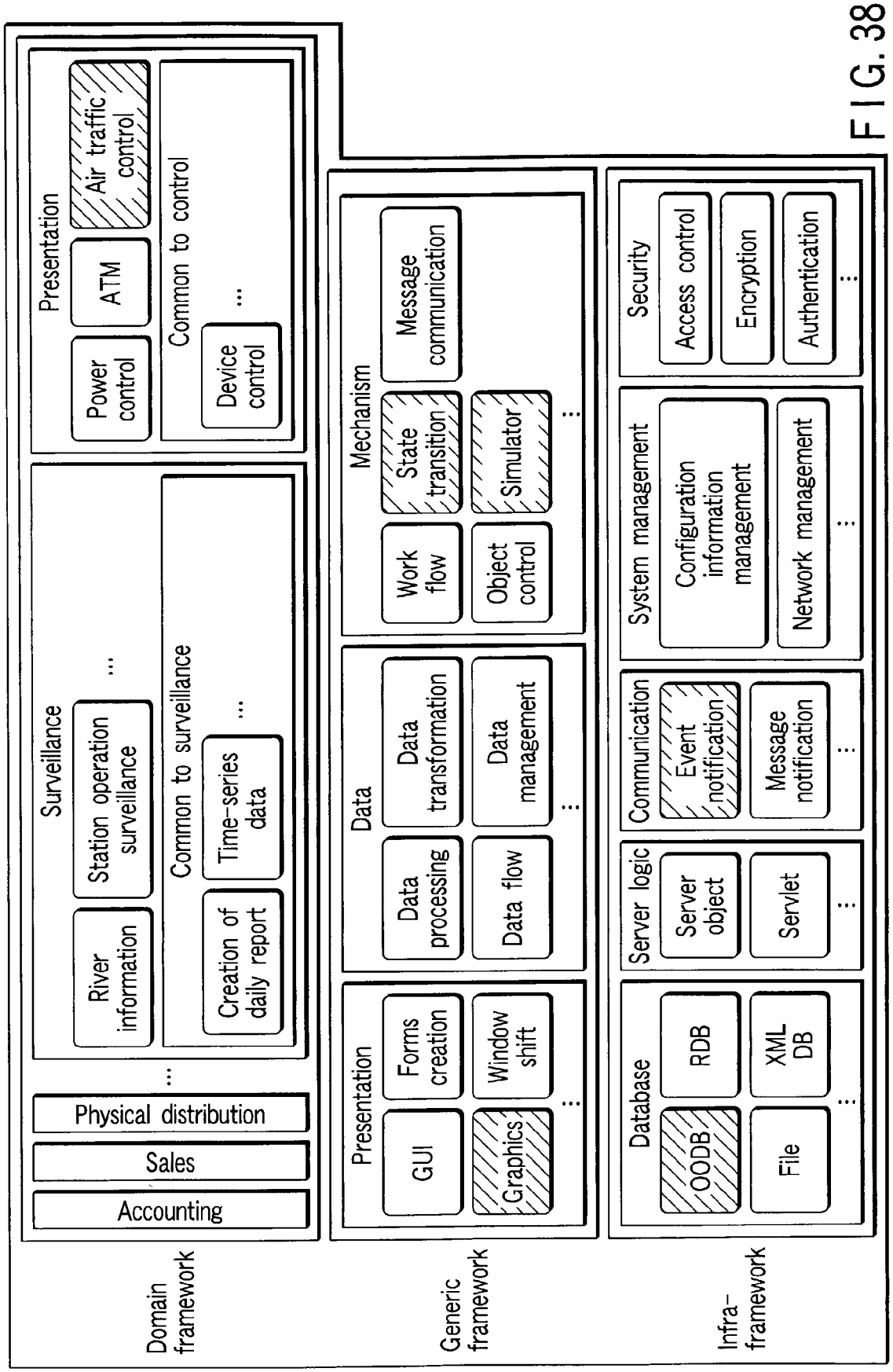
FIG. 38 is a view showing an example of how programs used for an air traffic control support system are designated.

FIG. 38 is a view showing an example of how programs used for an air traffic control support system are designated.

Figure 39:
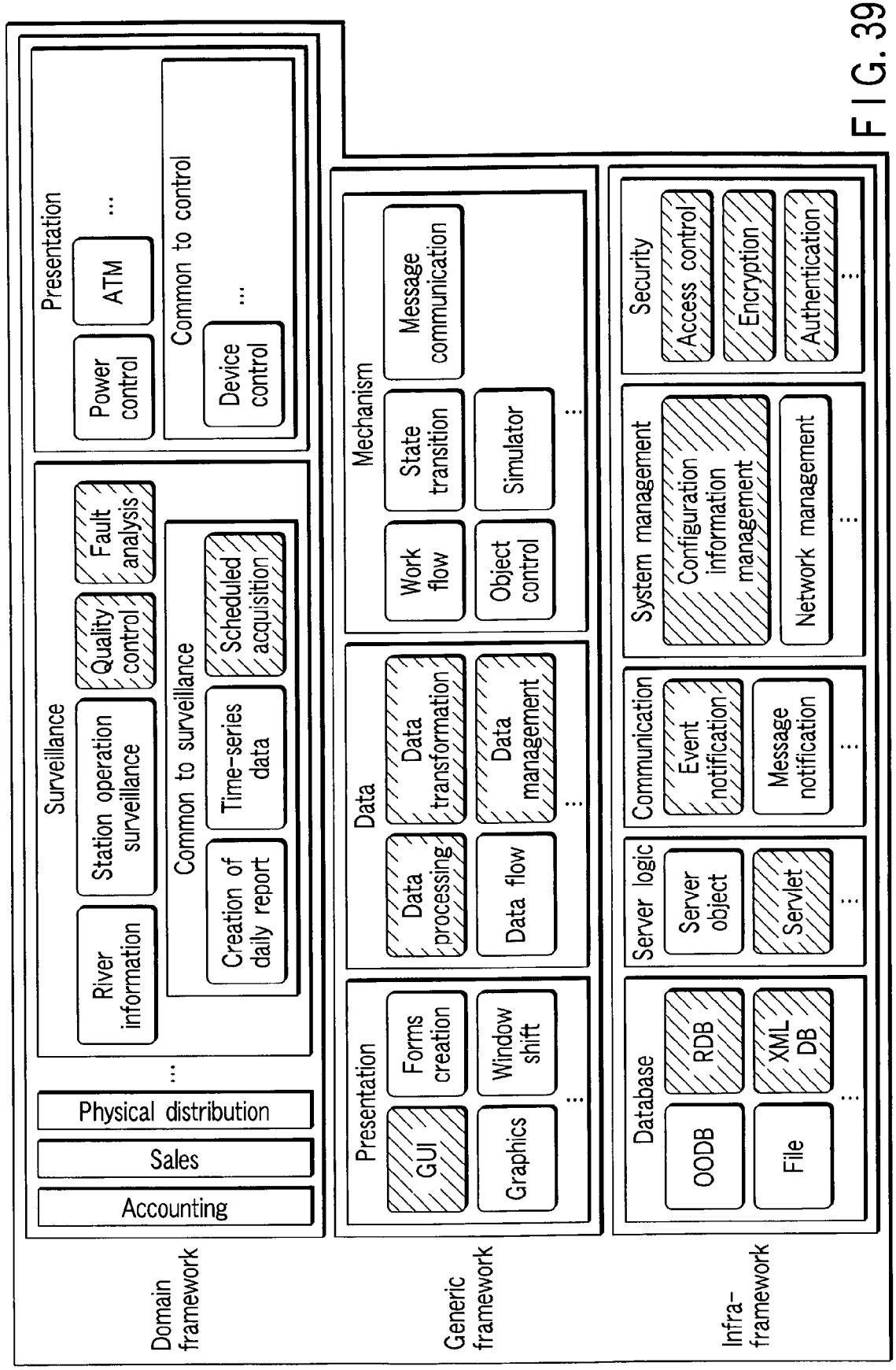
FIG. 39 is a view showing an example of how programs used for an inventory management system are designated.

FIG. 39 is a view showing an example of how programs used for an inventory management system are designated.

The above frameworks can be developed by using, for example, the framework development support program 28 according to the fifth embodiment.

By using the above framework architecture, the system developer can designate programs and frameworks to be used from the respective categories. This allows the system developer to efficiently select software.

The arrangements of the units, processes, functions, and the constituent elements of the computer system 3 which are implemented by the system development support program 1 and framework development support program 28 according to each embodiment described above can be changed, arbitrarily combined, or divided as long as similar functions can be implemented.

Seventh Embodiment

In the seventh embodiment, application modes of the system development support program 1 and framework development support program 28 described in each of the above embodiments will be described. Although the following description is about a system development support program 1, the same applies to a framework development support program 28.

FIG. 40 is a block diagram exemplifying the form in which an ASP (Application Service Provider) provides the service executed by the system development support program 1.

A system developer 37 can easily and efficiently develop a system by using the system development support program 1 managed by an ASP 40 from a local client 38 through a network 39 such as the Internet.

In addition, the system developer 37 can efficiently perform maintenance and operation by receiving the service from the ASP 40 as compared with a case wherein he/she uses the system development support program 1 by himself/herself.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A computer readable medium having computer readable program code means embodied therein, the computer program code means comprising:
a first computer readable program code that presents a user with architecture information in which framework candidates are hierarchically classified according to properties, and accepts a designation of a framework, of the candidates, which are to be included in a system as a development target from the user, the architecture information having a framework layer and application layer;
a second computer readable program code that supports the user to determine a reference model representing a general structure of the system, the reference model being a standard model for domain object modeling and representing a logic structure expressing a given domain software structure;
a third computer readable program code that supports the user to extract an object to be included in the system, in accordance with the reference model determined by the user; and
a fourth computer readable program code that supports the user to develop the system, on the basis of the framework designated by the user and the object extracted by the user.

2. The computer readable medium according to claim 1, comprising:
a fifth computer readable program code that supports the user to determine a portion of the system to which structured data having data items hierarchically described is to be applied;
a sixth computer readable program code that presents the user with the architecture information and the portion to which the structured data is to be applied, and accepts, from the user, a designation of a framework of the candidates to which the structured data is to be applied in the system; and
a seventh computer readable program code that supports the user to determine whether the object extracted by the user handles the structured data, wherein the fourth computer readable program code supports the user to develop the system on the basis of the framework designated by the user, the designation of the framework to which the structured data is to be applied, the object extracted by the user, and the result of determining whether the object handles the structured data.

3. The computer readable medium according to claim 1, comprising a fifth computer readable program code that registers a reference model newly defined by the user so as to use the model for a subsequent reference model determination.

4. The computer readable medium according to claim 1, wherein the medium is used to develop a new framework instead of the system.

5. The computer readable medium according to claim 4, comprising a fifth computer readable program code that includes the new framework in the architecture information in accordance with a property of the new framework.

6. The computer readable medium according to claim 4, comprising a fifth computer readable program code that supports the user to update the new framework in order to cope with a system developed on the basis of the new framework.

7. The computer readable medium according to claim 4, comprising a fifth computer readable program code that supports the user to update a schema of data in the new framework in order to cope with a system developed on the basis of the new framework.

8. The computer readable medium according to claim 1, wherein
the framework layer includes a domain framework, generic framework, and infra-framework.

9. A method for supporting system development by a computer, comprising:
presenting a user with architecture information in which framework candidates are hierarchically classified according to properties, the architecture information having a framework layer and application layer;
accepting a designation of a framework, of the candidates, which are to be included in a system as a development target from the user;
supporting the user to determine a reference model representing a general structure of the system, the reference model being a standard model for domain object modeling and representing a logic structure expressing a given domain software structure;
supporting the user to extract an object to be included in the system in accordance with the reference model determined by the user; and
supporting the user to develop the system on the basis of the framework designated by the user and the object extracted by the user.

10. The method according to claim 9, comprising, in a step before the architecture information is presented to the user, supporting the user to hierarchically classify the framework candidates according to properties and define architecture information.

11. The method according to claim 9, comprising, in a step before the reference model is determined, supporting the user to define a new reference model that can be used to determine a subsequent reference model.

12. The method according to claim 9, wherein development of a new framework is supported instead of the system.

13. The method according to claim 12, comprising, in a step after the new framework is developed by the user, including the new framework in the architecture information in accordance with a property of the new framework.

14. The method according to claim 12, comprising, in a step after the new framework is developed by the user, supporting the user to update the new framework in order to cope with a system developed on the basis of the new framework.

15. The method according to claim 12, comprising, in a step after the new framework is developed by the user, supporting the user to update a schema of data in the new framework in order to cope with a system developed on the basis of the new framework.

16. The method according to claim 8, wherein
the framework layer includes a domain framework, generic framework, and infra-framework.

17. A method for supporting system development by a computer, comprising:
supporting a user to determine a portion, of a system as a development target, to which structured data having data items hierarchically described is to be applied;
presenting the user with architecture information in which framework candidates are hierarchically classified according to properties and the portion to which the structured data is to be applied, and accepting, from the user, a designation of a framework, of the candidates, which is to be included in the system and designation of a framework to which the structured data is to be applied in the system, the architecture information having a framework layer and application layer;

supporting the user to determine a reference model representing a general structure of the system, the reference model being a standard model for domain object modeling and representing a logic structure expressing a given domain software structure;

supporting the user to extract an object to be included in the system in accordance with the reference model determined by the user;

supporting the user to determine whether the object extracted by the user handles the structured data; and supporting the user to develop the system on the basis of the framework designated by the user, the designation of the framework to which the structured data is to be applied, the object extracted by the user, and the result of determining whether the object handles the structured data.

18. The method according to claim 17, wherein
the framework layer includes a domain framework, generic framework, and infra-framework.

19. A system for supporting system development, comprising:

an architecture determination unit that presents a user with architecture information in which framework candidates are hierarchically classified according to properties, and accepts a designation of a framework, of the candidates, which are to be included in a system as a development target from the user, the architecture information having a framework layer and application layer;

a reference model construction unit that supports the user to determine a reference model representing a general structure of the system, the reference model being a standard model for domain object modeling and representing a logic structure expressing a given domain software structure;

an object extraction unit that supports the user to extract an object to be included in the system, in accordance with the reference model determined by the user; and an object implementation unit that supports the user to develop the system, on the basis of the framework designated by the user and the object extracted by the user.

20. The system according to claim 19, wherein
the framework layer includes a domain framework, generic framework, and infra-framework.

* * * * *